United States Patent
Furtner

(10) Patent No.: US 12,468,972 B2
(45) Date of Patent: Nov. 11, 2025

(54) MULTI DIMENSIONAL ELECTRODE CONTROLLER FOR QUANTUM COMPUTING

(71) Applicant: Infineon Technologies Austria AG, Villach (AT)

(72) Inventor: Wolfgang Furtner, Fuerstenfeldbruck (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 858 days.

(21) Appl. No.: 17/715,731

(22) Filed: Apr. 7, 2022

(65) Prior Publication Data
US 2023/0325698 A1 Oct. 12, 2023

(51) Int. Cl.
*G06N 10/40* (2022.01)
(52) U.S. Cl.
CPC ...................... *G06N 10/40* (2022.01)
(58) Field of Classification Search
CPC ....................................................... G06N 10/40
USPC ............................................................ 716/100
See application file for complete search history.

(56) References Cited

U.S. PATENT DOCUMENTS

| 8,969,800 | B1* | 3/2015 | Tolmachev | H01J 49/062 |
| | | | | 250/290 |
| 11,876,092 | B2* | 1/2024 | Deen | H10D 84/811 |
| 2022/0037313 | A1* | 2/2022 | Deen | H10D 1/665 |
| 2022/0366287 | A1* | 11/2022 | Hendrickson | G06N 10/00 |
| 2024/0403678 | A1* | 12/2024 | Li | G06N 10/70 |

* cited by examiner

Primary Examiner — Jack Chiang
Assistant Examiner — Suchin Parihar
(74) Attorney, Agent, or Firm — SLATER MATSIL, LLP

(57) ABSTRACT

A method and apparatus for multidimensional ion shuttling, the apparatus including a first shuttling lane having first lane elements, a second shuttling lane having second lane elements with the second shuttling lane intersecting the first shuttling lane, first electrode elements along the first movement lane, second electrode elements along the second movement lane, an electrode control circuit connected to each of the first and second electrode elements, and a voltage control circuit connected to each electrode element of the first electrode elements and the second electrode elements. The voltage control circuit selectively provides at least one voltage to one or more electrode elements of the first electrode elements and of the second electrode elements according to signaling from the electrode control circuit, and the at least one voltage controls movement of an ion along at least one of the first shuttling lane or the second shuttling lane.

20 Claims, 13 Drawing Sheets

MULTI DIMENSIONAL ELECTRODE CONTROLLER FOR QUANTUM COMPUTING

TECHNICAL FIELD

The present invention relates generally to a system and method for moving ions in a tapped ion quantum computing (TIQC) system, and, in particular embodiments, to a system and method for proving multidimensional routing and movement of ions.

BACKGROUND

Generally, trapped ion quantum computing uses ions as qubits for computation, with the excitation state of an electron indicating a logical value or logic state. Ions such as barium (Ba), magnesium (Mg), calcium (Ca), beryllium (Be), or the like, may be positively charged, and a single electron in the outer shall of the ion used as the logic element. Two or more ions may be entangled, as changing the state of one qubit causes the entangled qubits to change their state immediately, providing substantial speed and power savings over conventional computing.

However, quantum computing requires a well-controlled environment, and precise handling of the ions. Generally, ions in a TIQC system are trapped or controlled using a radio frequency (RF) field operating at around 200 volts, and 20 megahertz (MHz). Additionally, ions, once entangled, have a limited duration for which they will stay entangled, requiring rapid handling. The ions also typically require cryogenic conditions to achieve the maximum benefit of quantum computing. Thus, while e.g. photonic quantum computing works at room temperature, cryogenic trapped ion quantum computing is performed in a sealed cryogenic chamber kept between around 4 and 10 Kelvin.

SUMMARY

An embodiment apparatus for multidimensional ion shuttling includes a first shuttling lane having first lane elements, a second shuttling lane having second lane elements, wherein the second shuttling lane intersects the first shuttling lane at an intersection, first electrode elements located along the first movement lane, second electrode elements located along the second movement lane, an electrode control circuit connected to each electrode element of the first electrode elements and the second electrode elements, and a voltage control circuit connected to each electrode element of the first electrode elements and the second electrode elements. The voltage control circuit is configured to selectively provide at least one voltage to one or more electrode elements of the first electrode elements and of the second electrode elements according to signaling from the electrode control circuit, and the at least one voltage controls movement of an ion along at least one of the first shuttling lane or the second shuttling lane.

An embodiment multidimensional ion shuttling apparatus includes electrode elements located along a first shuttling lane, an electrode control circuit connected to each of the electrode elements, where the electrode control circuit is configured to provide an activated first electrode select signal to a first group of electrode elements that is of the electrode elements that includes at least shuttling electrode elements of a shuttling electrode group, and where the electrode control circuit is configured to provide an activated first shuttle enable signal to each first shuttling electrode element, and a voltage control circuit connected to each of the electrode elements, where the voltage control circuit is configured to provide one or more shuttling voltages of a shuttling voltage profile to the shuttling electrode elements of the shuttling electrode group. The electrode elements are configured to apply a respective received shuttling voltage on an electrode of the respective electrode element in response to both the first electrode select signal and the first shuttle enable signal received at the respective electrode element being activated.

An embodiment ion shuttling method for a trapped ion quantum computing system includes identifying, as first shuttling electrode elements of a shuttling electrode group, first electrode elements of a plurality of electrode elements of an ion shuttling system, where the first electrode elements are located at a first location along a first shuttling lane, determining one or more shuttling voltages of a shuttling voltage profile, providing the one or more shuttling voltages to the first shuttling electrode elements of the shuttling electrode group, providing a first activated electrode select signal to a first group of electrode elements that includes at least the first shuttling electrode elements, providing a first activated shuttle enable signal to each first shuttling electrode element, generating, at each first shuttling electrode element, a selected voltage for the respective first shuttling electrode element in response to both the first electrode select signal and the first shuttle enable signal being activated for the respective first shuttling electrode element, where the selected voltage is the shuttling voltage provided to the first respective shuttling electrode element and which is set by the respective first shuttling electrode element, and shuttling an ion along the first shuttling lane by generating an electrical field (E-field), where the E-field is generated by applying the selected voltage of each first shuttling electrode element to an electrode of the respective first shuttling element.

In some embodiments, the method further includes identifying, as second shuttling electrode elements of the shuttling electrode group, second electrode elements of the plurality of electrode elements, where the second shuttling electrode elements are located at a second location along a second shuttling lane that intersects the first shuttling lane at an intersection, providing the one or more shuttling voltages to the second shuttling electrode elements, providing a second activated electrode select signal to a second group of electrode elements that includes at least the first shuttling electrode elements, providing a second activated shuttle enable signal to each second shuttling electrode element, generating, at each second shuttling electrode element, a selected voltage for the respective second shuttling electrode element in response to both the second electrode select signal and the second electrode select signal being activated for the respective second shuttling electrode element, where the selected voltage is the shuttling voltage provided to the respective second shuttling electrode element and which is set by the respective second shuttling electrode element, and shuttling the ion along the second shuttling lane by generating an E-field, where the E-field is generated by applying the selected voltage of each second shuttling electrode element to an electrode of the respective second shuttling element.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
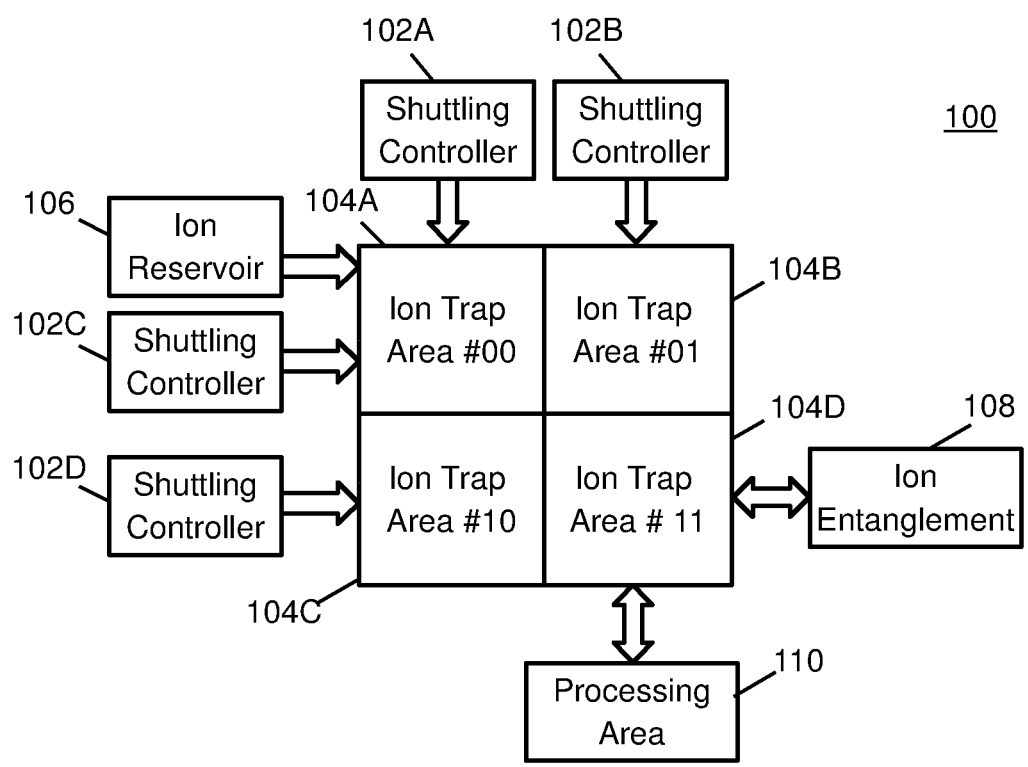
FIG. 1 is a logical diagram illustrating a trapped ion quantum computing (TIQC) system with a shuttling system according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In trapped ion quantum computing system, electrostatic potentials are used to move ions between storage and processing locations in a process called ion shuttling. In order to control these potentials, hundreds, or even thousands, of electrodes must be simultaneously controlled in order to provide the desired electrical field (E-field). However, individualized control of the electrodes requires use of digital-to-analog converters (DACs). Additionally, the required electrical connections needed to connect each DAC to each electrode require that a wire be passed though the envelope of the cryogenic containment system.

The principles presented herein are directed to providing a system for ion shuttling using a limited number of DACs that are multiplexed to a large number of electrodes in a multidimensional array. The multidimensional ion shuttling system provides for shuttling of multiple ions in multiple different directions simultaneously using the same DACS. Thus, the cost and power requirements associated with a one-to-one DAC-to-electrode arrangement is reduced by using the same DACs to control multiple electrodes. Additionally, the multidimensional nature of the ion shuttling system provides an improved flexibility in the ion shuttling system. A limited number of DACs being used to control the electrodes also limits the number of electrical connections that need to pass through the cryogenic containment system envelope, simplifying the TIQC system by permitting signals to be passed through a limited number of digital pairs of differential wires and accompanying ground and supply voltage wires that provide signals such as a clock+/− or data+/− signal.

FIG. 1 is a logical diagram illustrating a trapped ion quantum computing (TIQC) system 100 with an ion shuttling system according to some embodiments. The TIQC system 100 has one or more ion trap areas 104A-104D that including ion shuttling systems, and which are configure to shuttle ions between target areas such as an ion reservoir 106, ion entanglement region 108, and other areas such as ion disposal areas (not shown), processing areas no, and between the ion trap areas 104A-104D. The TIQC system 100 may also have one or more shuttling controllers 102A-102D electrically connected to the ion shuttling systems of the ion trap areas 104A-104D to control movement of the ions.

While the TIQC system 100 is illustrated with four ion trap areas 104A-104D and four shuttling controllers 102A-102D, with the ion trap areas 104A-104D in a symmetrical arrangement, the TIQC system 100 is not limited to such an arrangement. The shuttling controllers 102A-102D provide addressable voltage control of electrodes, and are, therefore, configured to control any number of cascaded ion trap areas 104A-104D, in any arrangement. Additionally, the shuttling controller 102A-102D may be provide as a unitary controller, with a single controller controlling any number or size of the ion trap areas 104A-104D. The ion trap areas 104A-104D may also be cascaded so that additional ion trap areas 104A-104D and shuttling controllers 102A-102D may be connected to existing ion trap areas 104A-104D and shuttling controller 102A-102D to expand the shuttling area, number of ions controlled, and capabilities of the ion shuttling system 100.

Additionally, the shuttling system 100 may have a radio frequency (RF) system (not shown) that provides an RF containment field separately from the DC bias of the shuttling electrodes. The RF field may be provided by electrodes that are separate from electrodes used to provide a shuttling or peeking voltage. In some embodiments, the RF field may field be operated at around 200 volts, and 20 megahertz (MHz), and the DC fields may be provided locally and separately to shuttle ions being contained by the RF field.

Figure 2:
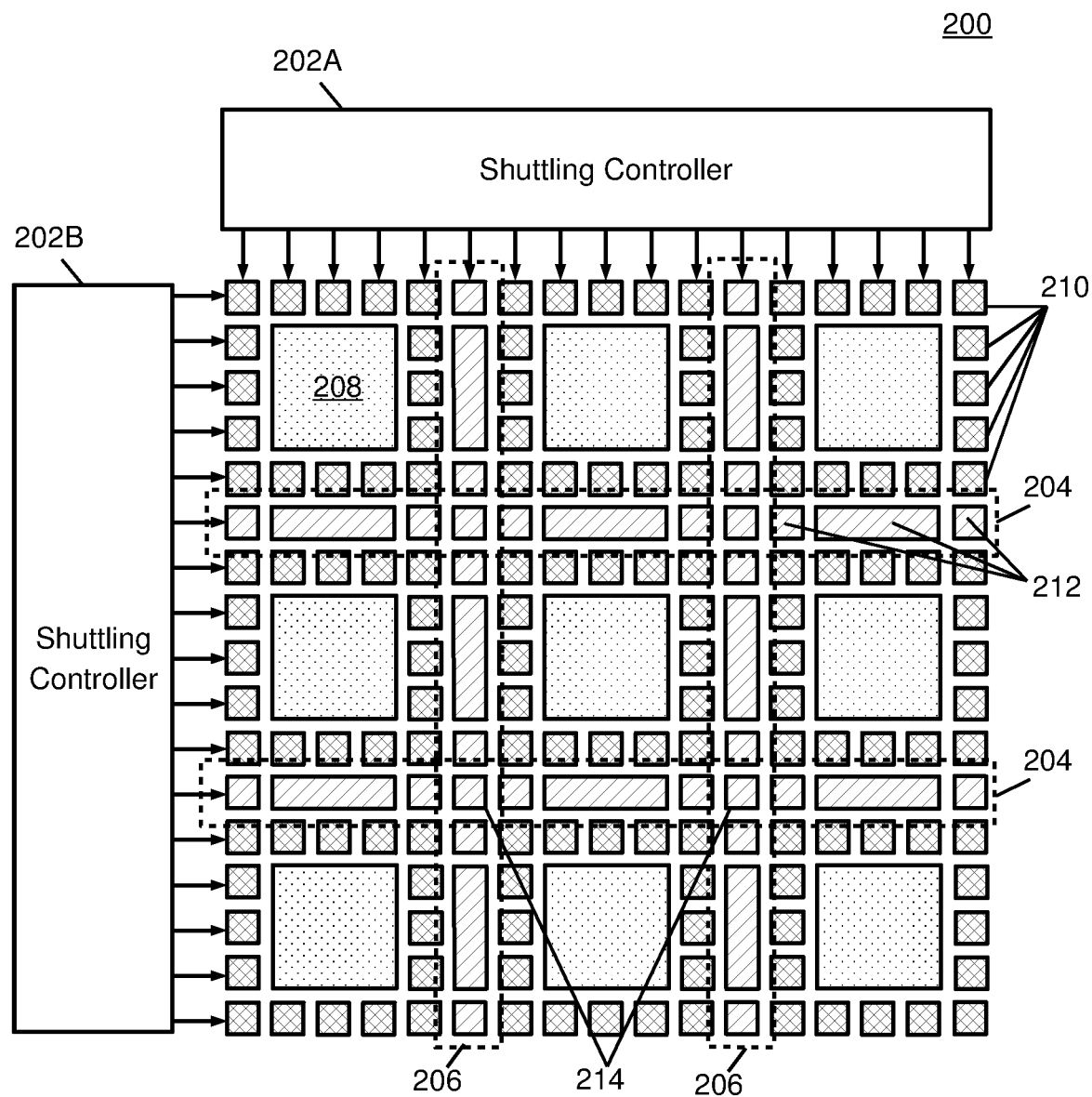
FIG. 2 is a diagram illustrating an ion shuttling system according to some embodiments.

FIG. 2 is a diagram illustrating an ion shuttling system 200 according to some embodiments. The ion shuttling system 200 includes a shuttling controller 202 comprising a first shuttling controller portion 1202A and second shuttling controller portion 202B. The first shuttling controller portion 202A and second shuttling controller 202*b* may be connected to a set of voltage electrodes 210 arranged in a two dimensional pattern, or in another arrangement with one dimension, or in three dimensions for layered patterns. The shuttling controller 202 provides a direct current (DC) biasing voltage to the voltage electrodes 210 to move and steer ions along shuttling elements 212 of shuttling lanes 204, 206. The shuttling controller 202 provides a voltage to each electrode 210, which is set by a latch associated with the electrode 210. Using a latch, rather than a DAC, at each electrode 210 permits for a lower component count, as the DAC requires a far greater number of components than a latch. The shuttling controller 202 may address an individual electrode element, which includes the latch and electrode 210 itself, and may provide a voltage signal or other signal to set the voltage for a particular electrode 210, which is set by the electrode's 210 associated latch. Thus, the voltage of each electrode 210 may be set individually, and is maintained until reset or changed.

In some embodiments, the shuttling controller 202 addresses the individual electrodes 210 by providing a shuttle enable (SHEN) signal that is stored in the latch, and which is used to apply a voltage, by controlling a transistor, to the electrode 210. An electrode select (ESEL) signal is used to select an electrode in the addressed row or column, and the ESEL signal activates the latch to latch the SHEN signal. Thus, the electrode 210 in a particular column and row may have a shuttling voltage set when the both the ESEL signal and SHEN signal are activated, and the electrode latch or storage element sets the voltage at the electrode 210.

Setting a DC voltage on a pair of electrodes 210 separated by a lane element 212 creates DC bias in the E-field, with the DC bias allowing control of the positing of an ion. Changing the voltage on the electrodes 210 permits control of the movement of the ion, and with electrodes 210 being located on each side of a lane element 212, ions may be moved along the lane elements 212 in shuttling lanes 204, 206. The shuttling lanes 206, 204 may be arranged so that shuttling lanes 204, 206 cross to form intersections 214 to allow for switching an ion onto different shuttling lanes 204, 206 for two dimensional movement. The electrodes 210 and lane elements 212 may be arranged so that free space is created between the electrodes 210, and shield elements 208 may be provided to shield the electrodes 210 and ions located in shuttling lanes 204, 206, from voltages provided for other ions in other locations along the shuttling lanes 204, 206. Such an arrangement may reduce cross-talk between ions in the shuttling system and simplify production of the shuttling system. Additionally, while the shuttling lanes 204, 206 and electrodes 210 are arranged in FIG. 2 in a symmetrical pattern, the electrodes 210 and shuttling lanes 204, 206 are not limited to such an arrangement, as any arrangement in two dimensions may be provided, including an arrangement where shuttling lanes 204, 206 intersect or cross at non-right angles. Additionally, shuttling lanes 204, 206 are not limiting to crossing each other, as the shuttling lanes 204, 206, may form a three way, or 'T' intersection, or may form a turn or angle, such as an 'L' shaped intersection.

In some embodiments, the ion shuttling system 200 may be formed using semiconductor packaging or fabrication techniques, for example, by depositing conductive material on a substrate and etching electrodes, lane elements, shields, connectors, and the like, into the surface. Additionally, connection layers, such as layers of conductive wiring, may be formed as a stack or on the backside of the system to provide connections to control elements such as multiplexers, DACs, and the like. One or more other devices, such as transistors, or logic gates, or other circuits may also be formed or located on the surface of the system substrate, on the backside of the substrate, on the wiring layers, or the like, to permit integration of the system elements into a package or system-on-chip (SoC). Additionally, any analog or digital circuit may be integrated with the passive part of the ion trap consisting of electrodes and wiring, and integration may be done on the same substrate or using stacked dies.

Figure 3A:
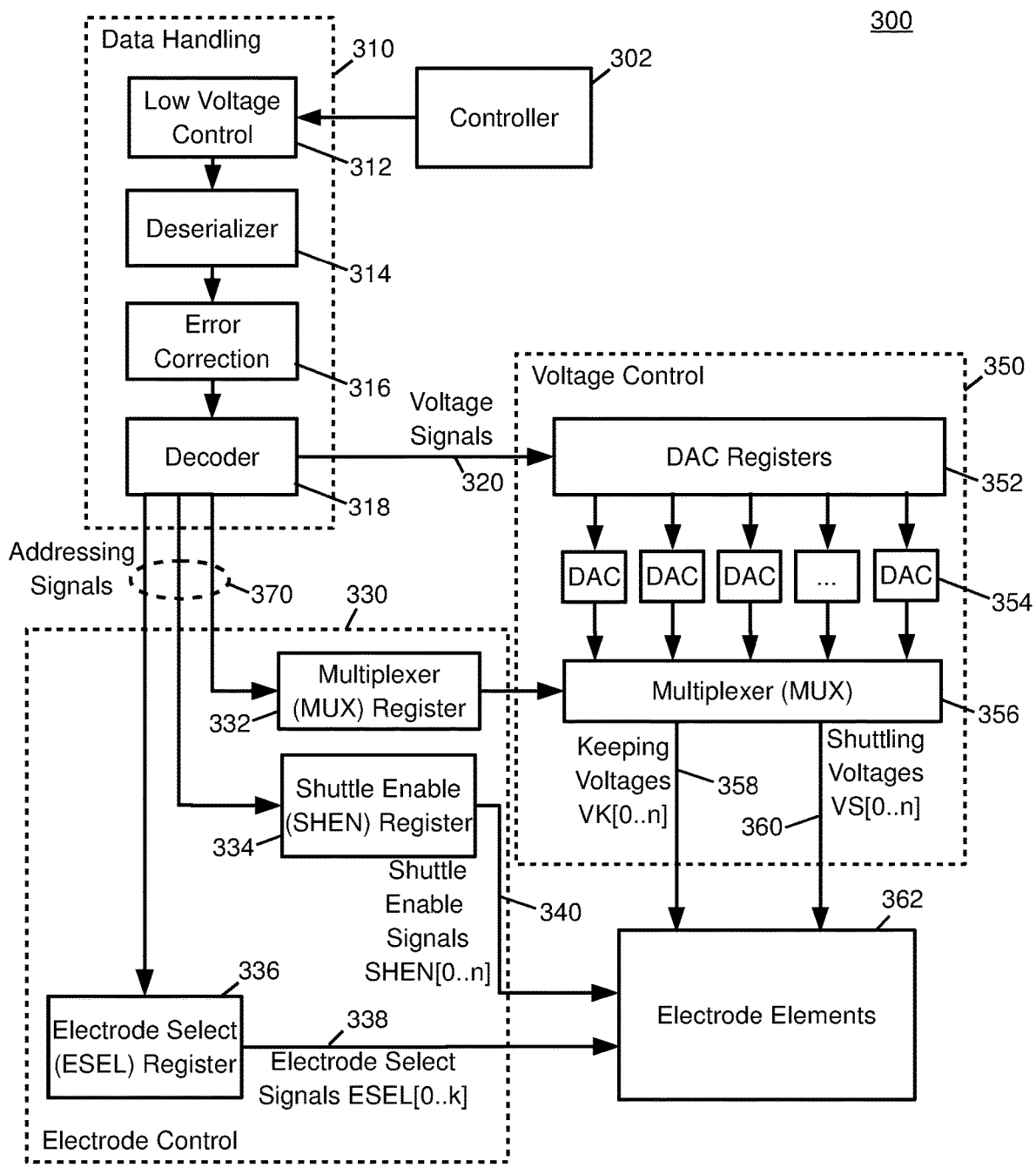
FIG. 3A is a diagram illustrating an ion shuttling control system according to some embodiments.

FIG. 3A is a diagram illustrating an ion shuttling control system 300 according to some embodiments. The shuttling control system 300 may have a data handling element 310 that receives data from a controller 302, and provides voltage signals 320 or data values to a voltage control 350 and addressing signals or values an electrode control 330. The voltage control 350 generates voltages from the data values, with the voltages applied to electrode elements 362 for creating the E-field at the electrodes. The electrode control 330 provides signals to the electrode elements 362 to activate particular electrode elements to load or set the voltage provided by the voltage control 350.

In some embodiments, the data handling element 310 has a digital control interface 312. The digital control interface 312 may, for example, be a low voltage serial receiver that receives data using a 2-wire system, or using another communication system or protocol. The digital control interface 312 may receive a serial communication from the controller 302 indicating ion control information, for example, a location for an ion within an ion trap, one or more voltages or voltage profiles for one or more electrodes, data indicating a path for ion movement or the like. Thus, the controller 302 may determine where a shuttling electrode group is located, and may identify or provide information for identification of the shuttling electrode group or shuttling electrodes or electrode elements. Additionally, the controller 302 may provide information for shuttling voltage or the like, so that the system may determine shuttling voltages for controlling ion movement.

The digital control interface 312 may have a serial interface to reduce the number of electrical connections that would be needed, for example, for a parallel interface or other interface type. However, where the number of connections is not a significant factor, the digital control interface 312 could be any another type of communications interface, such as a parallel interface, wireless interface, USB interface, or other communications interface or connection.

In some embodiments, the data handling element 310 also has a deserializer 314, which concerts data from a serial format to another format such as a digital format. The deserializer 314 works in conjunction with a serial digital control communications interface, and may be a different type of data converter, or even omitted, if the low voltage control in the digital control interface 312 uses another format. In some embodiments, the data handling element 310 also has an error correction element 316 that verifies, corrects, or requests resending of data.

The data handling element 310 may also have a decoder that decodes data element from the ion control information. The ion control information may include, for example, one or more voltage values and associated addresses, and the decoder 318 may determine the column and row of an electrode to be addressed and set with the associated voltage, and may provide addressing signals 370 to the electrode control 330, and provide a voltage to the voltage control 350. In some embodiments, the voltage values may include information, data, or values for a neutral voltage profile for holding an ion on a particular location, or include information, data or values for shuttling voltages for a voltage profile such as a shuttling voltage profile for moving an ion between lane elements. In some embodiments, a neutral voltage profile may be different from a shuttling voltage profile, with a symmetrical or simpler voltage profile since an E-field gradient needed to maintain an ion in a fixed location requires less shaping than an E-field gradient that would cause an ion to move in a desired direction. Additionally in some embodiments, the voltages may be keeping voltages for maintaining a base, default, or standard bias voltage against which the neutral voltage profiles or shuttling voltage profiles are changed to provide a localized E-field gradient to trap or control the ions.

In some embodiments, the ion control information may include an explicit address for a particular associated voltage level, and the ion control information may indicate explicit addresses and voltages for each electrode being set for a particular voltage profile. The voltage level may be indicated as an explicit voltage level as an integer or real number, such as +7.2 volts. In other embodiments, the voltage level may be indicated by an index that determines the voltage level from a predetermined formula, table, or the like. For example, the voltage may be indicated by an index of 4, which may be used to reference a table indicating a desired voltage value of +7.0v, or may be used in a calculation to determine the desired voltage, for example, by multiplying the index by a voltage factor to determine the desired voltage level.

In other embodiments, the ion control information may define a voltage profile and a base location. A voltage profile may indicate a type of movement, type of voltage profile, or the like, and the voltages for multiple electrodes that would be determined to provide the voltage profile may be predefined. For example, a voltage profile may have predetermined voltages for electrodes, with a first electrode pair at +6v, a second electrode pair at +2v, a third electrode pair at +4v, and a fourth electrode pair at +7v, the ion control information may describe an address for one or more of the electrode pairs, and the voltage for each electrode pair of the voltage profile may be determined based on the electrode pair's relative location to address based on the predetermined voltages for the voltage profile. In another embodiment, the ion control information may also describe a movement direction for the voltage profile so that an asymmetric voltage profile may be oriented correctly. In some embodiments, the ion control information may also include a path, speed or movement profile for the ion so that a voltages may be set by the decoder based on a time function, with, for example, new electrode voltages being set every second to move the voltage profile or change the voltages, causing the ion to move along the identified path or in the identified direction.

In some embodiments, the voltage control 350 comprises DAC registers 352, DACs 354 and a multiplexer (MUX) 356. The DAC registers 352 hold voltage values for the DACs, and the DACs convert digital voltage values to analog voltage values or signals. The DAC registers 352 may be used to hold the voltages long enough for the DACs 354 to propagate an analog voltage through themselves and through the multiplexer 356 to be provided to by the electrode elements 362. The analog voltage values may be sent to a multiplexer 356 that receives addressing information to route particular voltages to particular columns of electrode elements 362. Each DAC 354 may be set with a keeping voltage or shuttling voltage, so that, for example, an entire row, column, segment of columns or rows may be set. Setting a single row, column, row segment or column segment of the electrodes permits a limited number of DACs 354 to be used, as the DACs 354 may be reused to set another group of electrodes.

In some embodiments, the multiplexer 356 may be an analog multiplexer that passes on analog voltages rather than simply providing a digital output levels. Additionally, the analog multiplexer may be configured to allow selection of an analog shuttling voltage and selection of a keeping voltage for a plurality of electrodes.

The electrode control 330 may have a multiplexer register 332 that provides a control signal that selects one or more DACs 354 used to provide one or more voltages to selected electrode elements 362. The multiplexer register 332 may provide multiple control signals allowing selection of the voltage for different output lines. For example, in some embodiments, the multiplexer 356 may selectively provide a shuttling voltage VS 360 selected from a plurality of shuttling voltages VS 360 on a first output for a particular electrode column, and a keeping voltage VK 358 or neutral voltage selected from a plurality of keeping and neutral voltages on a second output for the particular electrode column. Providing both the shuttling voltage VS 360 and the keeping voltage VK 358 to a particular electrode permits the shuttling voltage VS 360 and keeping voltage VK 358 to be set to separate values, with an electrode enable signal ESEL provided to the electrode element 362 to be used to select between the shuttling voltage VS 360 and keeping voltage VK 358 for application to the electrode, and also allows each electrode in a group to be selectively set to the shuttling voltage VS 360 or keeping voltage VK 358 using the electrode enable signal. Additionally, the multiplexer may be configured to receive a plurality of different shuttling voltages VS 360 from a first plurality of the DACs 354, and provide at least one of the different shuttling voltages VS 360 to one or more outputs associated with the different electrode column. Thus, a DAC 354 may provide a shuttling voltage VS 360 that is used to set electrode elements 362 in different columns, reducing the number of DACs 354 required to set a great number of electrode elements 362. This may be achieved by setting different DACs to the different voltages required for a shuttling voltage profile, and using the DAC 354 to provide the required voltages for the different electrodes, rather than having a single DAC associated with electrode in a group, and potentially setting multiple DACs with the same voltage. Similarly, another DAC 354 may provide a keeping voltage VK 358 used to set a voltage in multiple electrodes, reducing the number of needed DACs 354.

In some embodiments, the electrode control 330 may also include a shuttle enable (SHEN) register 334 and an electrode select (ESEL) register 336. The SHEN register 334 receives addressing signals 370 from the decoder 318 indicating which electrodes are shuttling electrodes, namely electrodes that are assigned to have a voltage that is part of a shuttling voltage profile. The SHEN register 334 holds a value for shuttle enable signals SHEN [0 . . . n] 340 and provides one or more shuttle enable signals SHEN [0 . . . n] 340 to the electrode elements 362 to cause electrodes designated as the shuttling electrodes to use the shuttling voltages rather than the keeping voltages. Thus, the shuttle enable signals SHEN[0 . . . n] enable electrodes to act as shuttle electrodes.

The ESEL register 336 receives addressing signals 370 from the decoder 318 indicating which electrodes are activated. The ESEL register 336 holds values for electrode select signals ESEL [0 . . . k] and provides the electrode select signals ESEL [0 . . . k] to the electrode elements to activate or select designated electrodes to set the selected shuttling voltages 360 or keeping voltages 358s. Thus, the electrode select signals ESEL[0 . . . k] enable electrode elements 362 to apply a voltage to electrodes to create the E-field to control movement of an ion.

In some embodiments, a set of electrodes or a portion of an ion shuttling system may have electrodes in a single dimension, along a single movement path, or the like. In such embodiments, the electrode select signals ESEL[0 . . . k], shift enable signals SHEN[0 . . . n], shuttling voltages VS, and keeping voltages VK may be single sets of signals for single dimension electrode arrays. In other embodiments, a set off electrodes or a portion of an ion shuttling system may have multidimensional electrode arrangements, with one or more paths crossing each other or otherwise forming intersections. For the multidimensional electrode arrangements, one or more of the electrode select signals ESEL[0 . . . k], shift enable signals SHEN[0 . . . n], shuttling voltages VS, or keeping voltages VK may have multiple dimensions. For example, the electrode select signals ESEL[0 . . . k] may have electrode select signals for an x- and y-direction so that a group of electrodes may be selected from a grid. Thus, a range of electrodes in an x-direction, and a range of electrodes in a y-direction may be elected, with electrodes falling into both the selected x- and y-direction range are activated. The shift enable signals SHEN[0 . . . n], shuttling voltages VS, or keeping voltages VK may have similar x- and y-direction signals, or may be provided for an x- and y-direction.

Figure 3B:
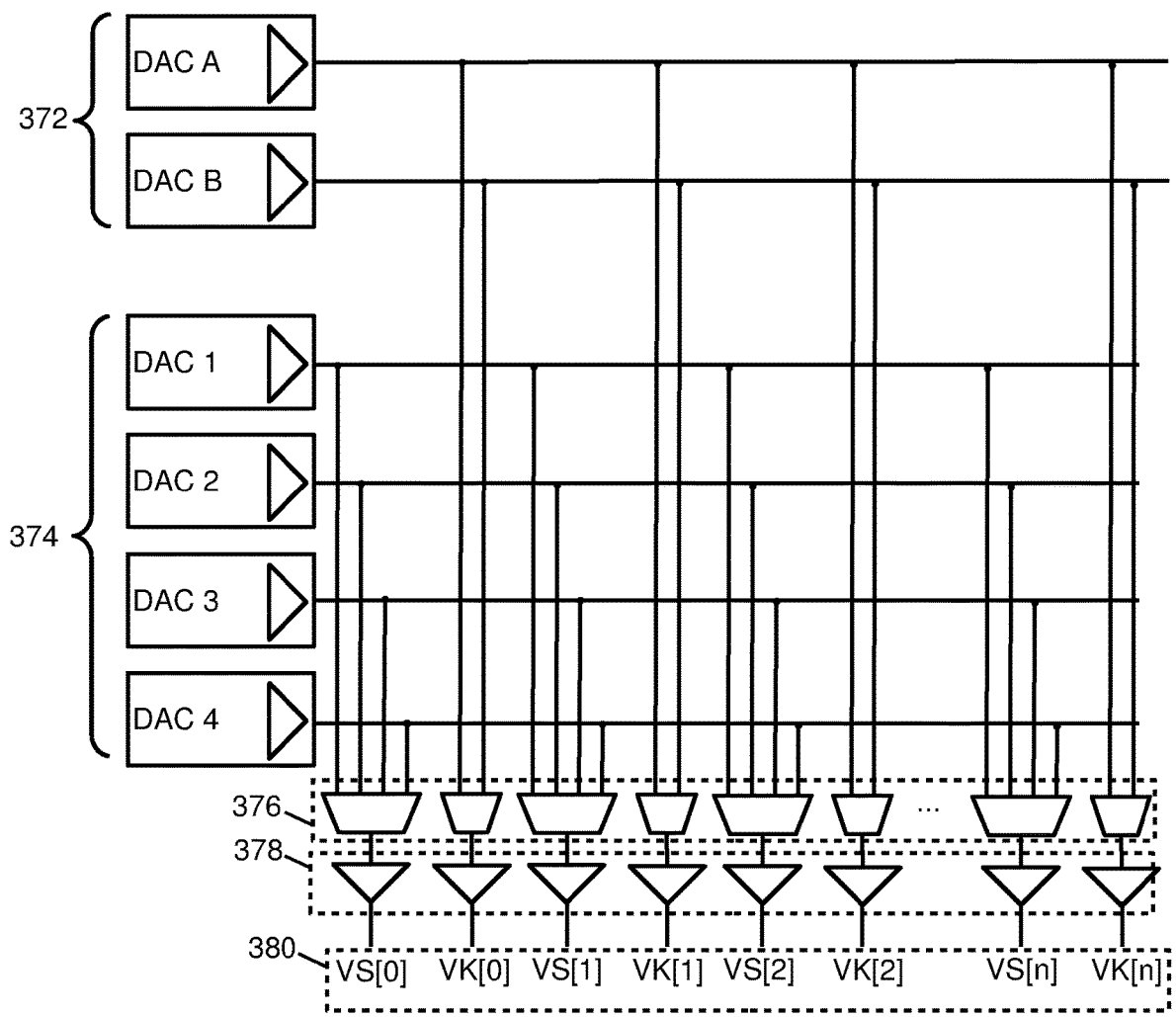
FIG. 3B is an analog multiplexer for an ion shuttling control system according to some embodiments.

FIG. 3B is an analog multiplexer 371 for an ion shuttling control system according to some embodiments. The analog multiplexer 371 may have a plurality of line multiplexers 376 that multiplex signals from a plurality of DACs. The DACs may include a plurality of keeping voltage DACs 372 and a plurality of shuttling voltage DACs 374. The line multiplexers 376 provide output signals 380 to different lines, or set of electrodes, and may include a plurality of shuttling voltage multiplexers and a plurality of keeping voltage multiplexers. Additionally, in some embodiments, each line multiplexer 376 provide an output signal 380 through a buffer 378, or through one or more other elements for processing, handling, manipulating or modifying the output signal 380.

Each shuttling voltage multiplexer is connected to a plurality of the shuttling voltage DACs 374, and may be switched to provide a shuttling voltage VS[0 . . . n] to a plurality of different electrodes by connecting a selected one of the shuttling voltage DACs 374 to one or more electrodes. Similarly, each keeping voltage multiplexer is connected to a plurality of the keeping voltage DACs 372, and may be switched to provide a keeping voltage VK[0 . . . n] to a plurality of different electrodes by connecting a selected on the keeping voltage DACs 372 to one or more electrodes. The electrodes may then be activated and selected to turn on the electrode and cause the electrode to use the provided shuttling voltage VS[0 . . . n] or the provided keeping voltage VK[0 . . . n].

Figure 4A:
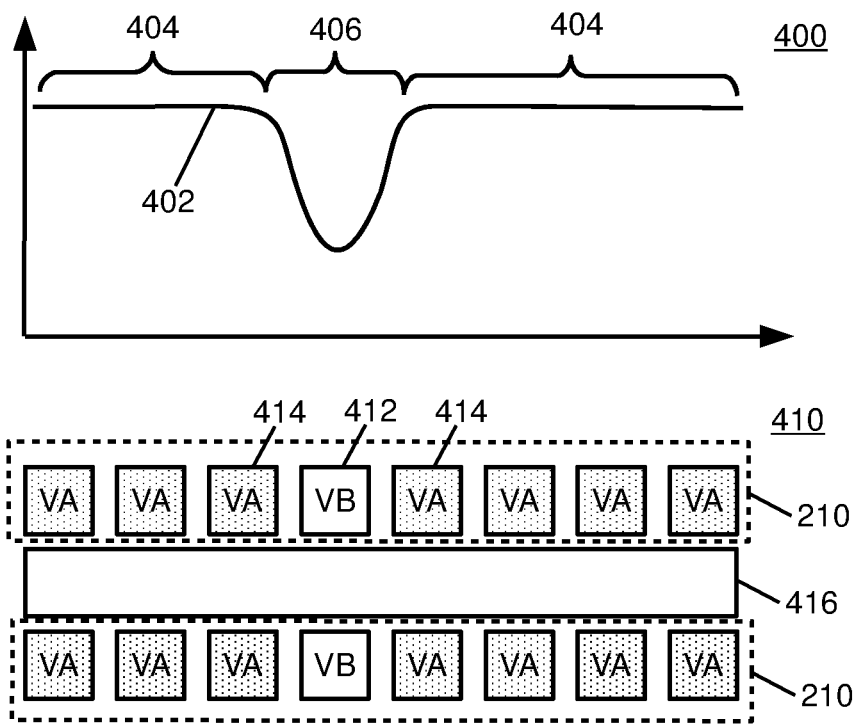
FIGS. 4A-4C illustrate application of voltages to an ion shuttling system according to some embodiments.
Figure 4B:
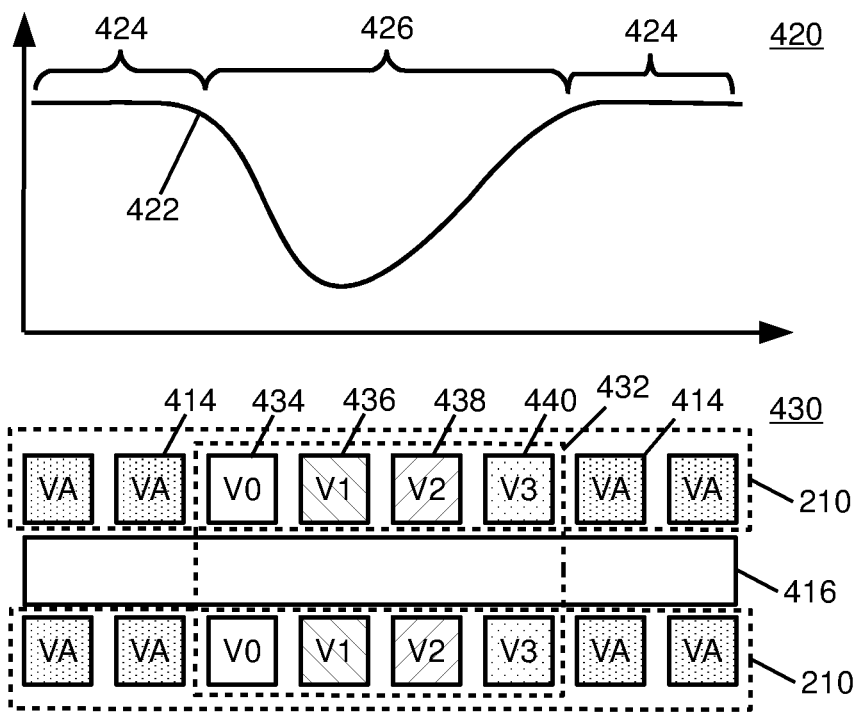

FIGS. 4A-4B illustrate application of voltages VA, VB, V0-V3 to an ion shuttling system according to some embodiments. FIG. 4A illustrates a chart 400 showing a neutral voltage profile 402 and system 410 having a set of electrodes 210 providing the neutral voltage profile 402.

A neutral voltage profile 402 may be one or more voltages applied to electrodes 210 that create a symmetrical E-field used to hold an ion in a particular location. The movement of the ions is controlled by a DC bias applied to electrodes 210, and the neutral voltage profile 402 may, in some embodiments, be provided by a neutral voltage region 406 that separates two keeping regions 404. The keeping regions have a default or keeping voltage VA that repels an ion more than the neutral voltage VB in a neutral voltage region 406. A neutral region voltage VB may be applied to one or more target electrodes 412, and the target electrodes 412 may be located between keeping electrodes 414 that have a keeping voltage VA applied. The neutral voltage profile 402 creates a well in the neutral voltage region 406 that allows the ion to remain controlled and substantially motionless or generally in a defined location. For example, for a positively charged magnesium ion (MO, the keeping voltage VA used for the keeping regions 404 has a greater positive magnitude than a neutral voltage VB of a neutral voltage region 406. In some embodiments, the DC bias voltages may be in the boy range, with, for example, the keeping voltage VA being set at about boy to create the keeping regions 404, and a neutral voltage VB or shuttling voltage used to create the neutral voltage region 406 being set around 2v, set to a negative voltage, or set to another voltage with a voltage differential from the keeping voltage permitting control of an ion. The higher voltages of the keeping regions 404 create a stronger positive E-field, causing the ion to remain trapped in the neutral voltage region 406. Providing electrodes 210 on opposite sides of a lane element 416 retains an ion in a shuttling lane, without causing the ion to sit directly on the electrode 210. It should be understood that these voltage values are merely an example, as actual voltages may vary greatly based on different shuttling approaches, trap geometries, ion species, ion distance to surface, and the like.

FIG. 4B illustrates a chart 400 showing a shuttling voltage profile 422 and system 430 having a set of electrodes 210 providing the shuttling voltage profile 422. A shuttling voltage profile 422 may be a set of voltages applied to electrodes 210 that creates an asymmetrical E-field to move an ion along a lane element 416. The shuttling voltage profile 422 may, in some embodiments be provided by a shuttling voltage region 426 that separates two keeping regions 424. In the shuttling voltage profile 422, the keeping regions 424 have a default voltage or keeping voltage VA that repels an ion more than the shuttling voltage V0 . . . V3 in a shuttling voltage region 426, similar to the neutral voltage region 406. However, the shuttling voltage region 426 may have an asymmetric E-field that provides a voltage field with lower voltage gradient or E-field gradient at one side that causes movement in a desired direction.

For example, a shuttling voltage profile 422 may be formed by a shuttling electrode group 432 having a first bounding shuttling electrode 434 with a first bounding shuttling voltage V0, an intermediate shuttling electrode 436 with an intermediate shuttling voltage V1 applied, and one or more additional bounding shuttling electrodes 438, 440 with additional bounding shuttling electrode voltages V2, V3 applied. In some embodiments, the additional bounding shuttling electrodes 438, 440 have different bounding shuttling voltages V2, V3 to provide a region with an E-field gradient or voltage gradient that is more shallow, or more gradual than a region with an E-field gradient or voltage gradient generated by the first bounding shuttling voltage V0. In some embodiments, this may be achieved by having a third bounding shuttling electrode 440 with a third bounding shuttling voltage v3 and a second bounding shuttling electrode 438 with a second bounding shuttling voltage v2, with the third bounding shuttling electrode 440 and the second bounding shuttling electrode 438 located between the intermediate shuttling electrode 436 and a keeping electrode 414. In some embodiments, the third bounding shuttling voltage V3 may be higher than the second bounding shuttling voltage V2, and the second and third bounding shuttling voltages V2, V3 may be between the keeping voltage VA and the intermediate shuttling voltage V1. Similarly, the first bounding shuttling voltage V0 may be between the keeping voltage VA and the intermediate shuttling voltage V1. For example, for the above mentioned $Mg^+$ ion, the keeping voltage VA may have a voltage profile with a maximum+10v DC bias, the first bounding shuttling voltage V0 may have a voltage profile with a maximum+6v DC bias, the intermediate shuttling voltage V1 may have a voltage profile with a maximum+2v DC bias, the second bounding shuttling voltage V2 may have a voltage profile with a maximum+5v DC bias, the second and the third bounding shuttling voltage V3 may have a voltage profile with a maximum+8v DC bias. In other embodiments, the shuttling voltages may have voltages profiles with different DC biases, in, for example, a range of +/−40v, and the voltages may be negative. Additionally, voltage profiles with larger voltages (either positive or negative) may be used to drive, for example, passive components at each electrode.

The electrodes 210 of shuttling electrode group 432 are formed in pairs straddling the lane element 416, and contain the ion within, or on, the lane element 416. The shuttling electrode group 432 may be adjusted to include different electrodes 210 by adjusting the voltage of various electrodes 210, effectively shifting the shuttling electrode group 432. The DACs provide each voltage necessary for forming the shuttling electrode group 432, and the multiplexer routes the shuttling voltages to selected electrodes 210 to form the shuttling electrode group 432. The DACS periodically route the shuttling voltages to different electrodes to shift the shuttling electrode group or form the shuttling electrode group 432 in a new location to move the ion.

While illustrated with four sets of electrodes in the shuttling electrode group 432, it should be understood that any number of electrode pairs may be used to form the shuttling electrode group 432, with more electrode pairs enlarging the voltage profile and spreading the voltage profile over a larger distance, which allows for more rapid shuttling of the ion with less heating of the ion.

Figure 4C:
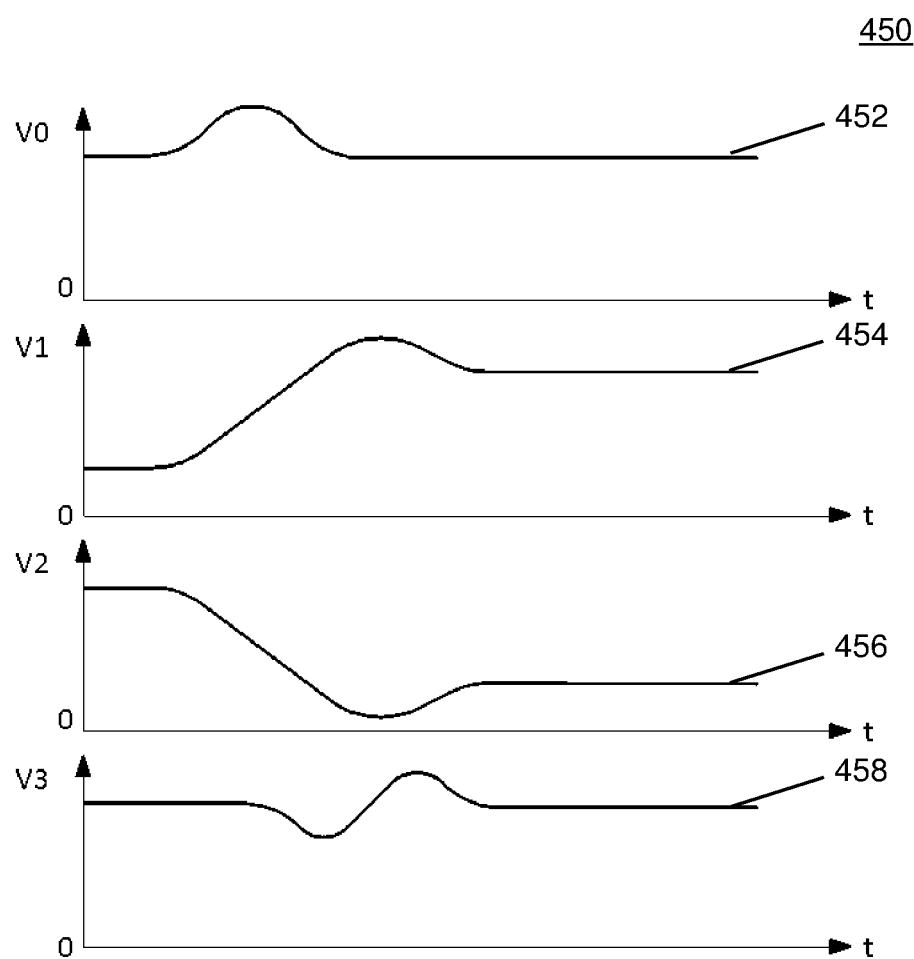

FIG. 4C illustrates transient voltage profiles 452-458 of voltages V0-V3 for electrodes of an ion shuttling system according to some embodiments. Voltages applied to each electrode of a shuttling group may vary over time to move an ion between electrodes. The time-varying voltages may each be a transient voltage profile 452-458, and each electrode of a shuttling electrode group may have a different transient voltage profile. Additionally, as the shuttling electrode group moves town a series of electrodes, electrodes may be provided with different transient voltage profiles in sequence. For example, for a first electrode acting as a first bounding shuttling electrode, a first bounding shuttling voltage V0 may be provided as a first transient voltage profile 452. Similarly, for a second electrode acting as an intermediate shuttling electrode, an intermediate shuttling voltage V1 may be provided as a second transient voltage profile 454, for a third electrode acting as a second bounding shuttling electrode, a second bounding shuttling voltage V3 may be provided as a third transient voltage profile 456, and for a fourth electrode acting as a third bounding shuttling electrode, a third bounding shuttling voltage V3 may be provided as a fourth transient voltage profile 458. In some embodiments, the DAC registers (FIGS. 3A, 3B) may provide the transient voltages by providing a portion of a transient voltage profile 452-458 at a particular time and varying the provided voltage over time according to the respective transient voltage profile.

Figure 5A:
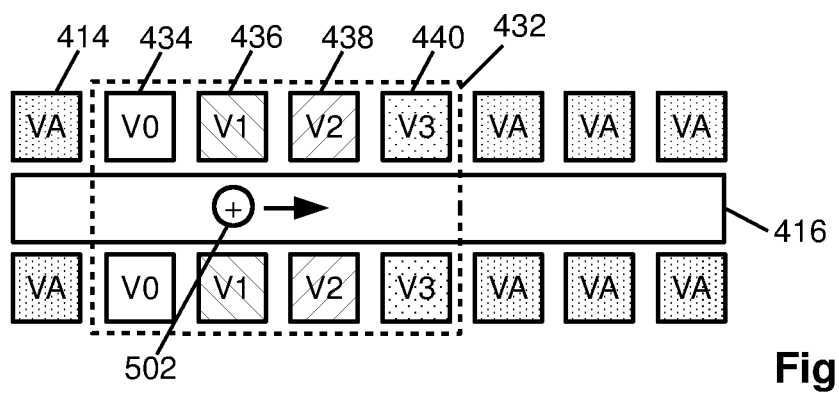
FIGS. 5A-5C illustrate a system using shuttling voltages to provide ion shuttling according to some embodiments.
Figure 5B:
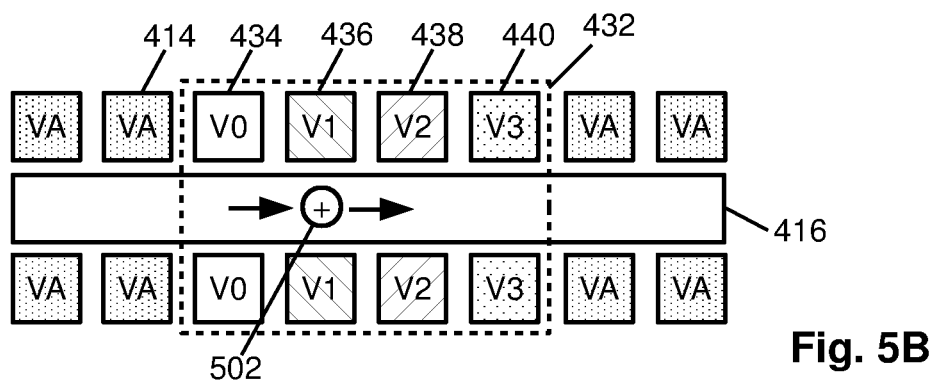
Figure 5C:
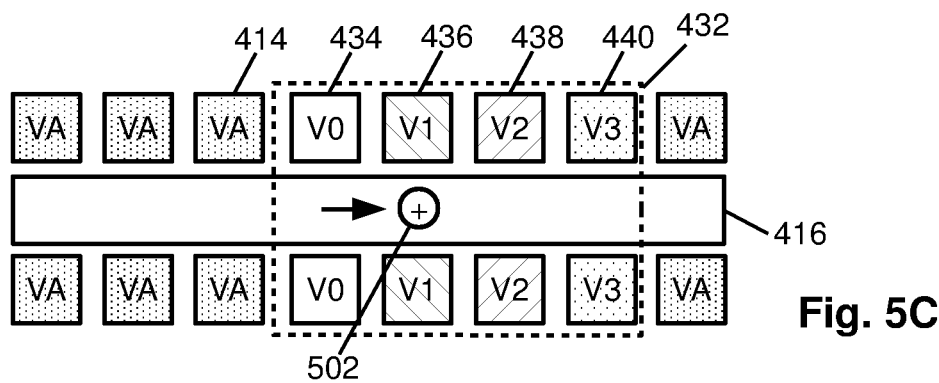

FIGS. 5A-5C illustrate a system using shuttling voltages to provide ion shuttling according to some embodiments. FIG. 5A illustrates a shuttling electrode group 432 in an initial position according to some embodiments. The shuttling electrode group 432 has first bounding shuttling electrode 434 with a first bounding shuttling voltage V0, an intermediate shuttling electrode 436 with an intermediate shuttling voltage V1 applied, a third bounding shuttling electrode 440 with a third bounding shuttling voltage v3 and a second intermediate shuttling electrode 438 with a second bounding shuttling voltage v2. In some embodiments, the voltages v0 . . . v3 may have values set as described above. In some embodiments, an ion 502 is controlled, along the lane element 416, by the shuttling electrode group 432. The shuttling electrode group 321 may be provided between keeping electrodes 414 with a keeping voltage VA. FIGS. 5B and 5C illustrate the shuttling electrode group 432 shifted by one and two electrodes, respectively, causing the ion 502 to advance along the lane element 416 when used with the transient voltage profiles, with the voltages v0 . . . v3 being modulated in order to advance the ion between the intermediate electrodes before the shuttling electrode group 432 is shifted. The intermediate shuttling voltage V1 of the intermediate shuttling electrodes 436 form a lowest voltage of the shuttling voltage profile, keeping the ion 502 primarily between the intermediate shuttling electrodes 436 as the shuttling electrode group 432, and associated shuttling voltage profile, advance along the lane element 416. In some embodiments, all voltages v0 . . . v3 of the shuttling electrode group 432 may be modulated using the transient voltage profiles to move the ion 502 between electrodes.

FIGS. 6A-6F illustrate use of shuttling voltages to provide ion shuttling in multidimensional systems according to some embodiments. In some embodiments, a shuttling electrode group 432 may be moved along one or more lanes 602, 604 to shuttle an ion 502 in a multidimensional ion shuttling system. Thus, the shuttling electrode group may move an ion 502 linearly through an intersection of two or more lanes 602, 604, and may also move the ion 502 from a first lane 602 to a second lane 604 to change direction of the ion 502 or move the ion 502 non-linearly.

Figure 6A:
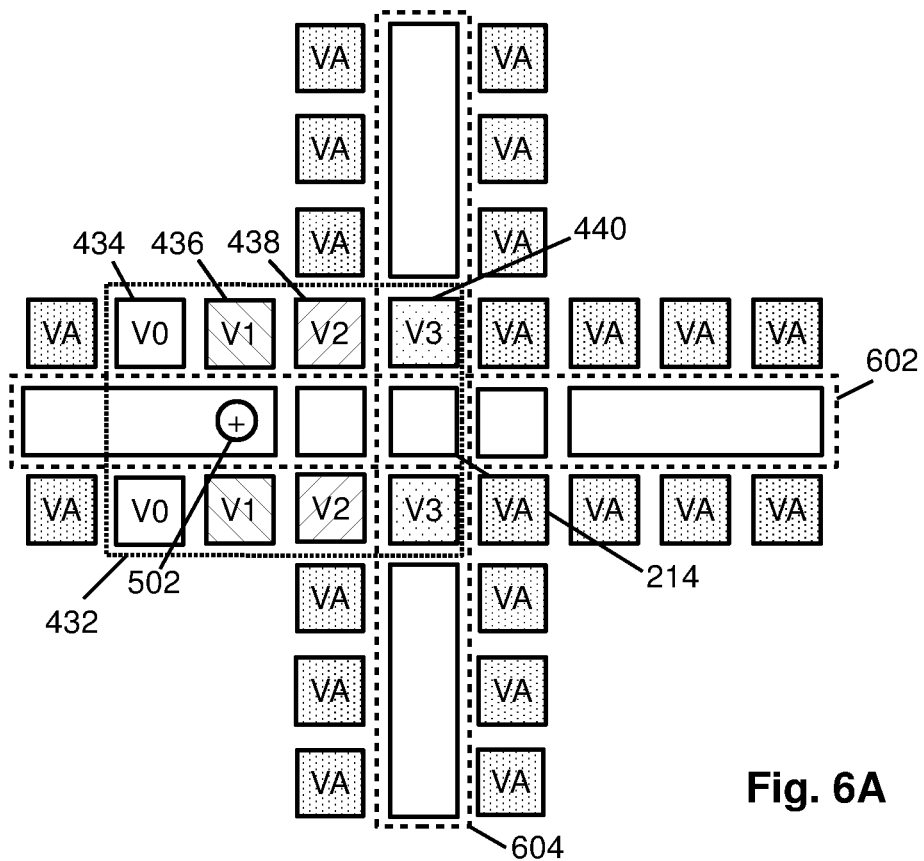
FIGS. 6A-6F illustrate use of shuttling voltages to provide ion shuttling in multidimensional systems according to some embodiments.

FIG. 6A illustrates a shuttling electrode group 432 in an initial position along a first lane 602 according to some embodiments. The shuttling electrode group 432 may include the electrodes as described above, with applied voltages providing a shuttling voltage profile that contains or controls an ion 502 on lane elements of the first lane 602. The first lane 602 may intersect a second lane 604 at an intersection 214, and the shuttling electrode group 432 may be moved or shifted to cause the ion 502 to move from the first lane 602 to the second lane 604 through the intersection 214. The shuttling electrode group 432 may straddle or span the intersection 214. Thus, in some embodiments, one or more lane elements from the lanes 602, 604 are used as electrodes in the shuttling electrode group 432. In some embodiments, one or more electrodes of the shuttling electrode group 432 are on an opposite side of the intersection 214 from the ion 502 and the intermediate shuttling electrodes 436. For example, in some embodiments, lane elements from the second lane 604 that span the intersection 214 may be used as the third bounding shuttling electrodes 440 when the ion 502 is shuttled along the first lane 602.

Figure 6B:
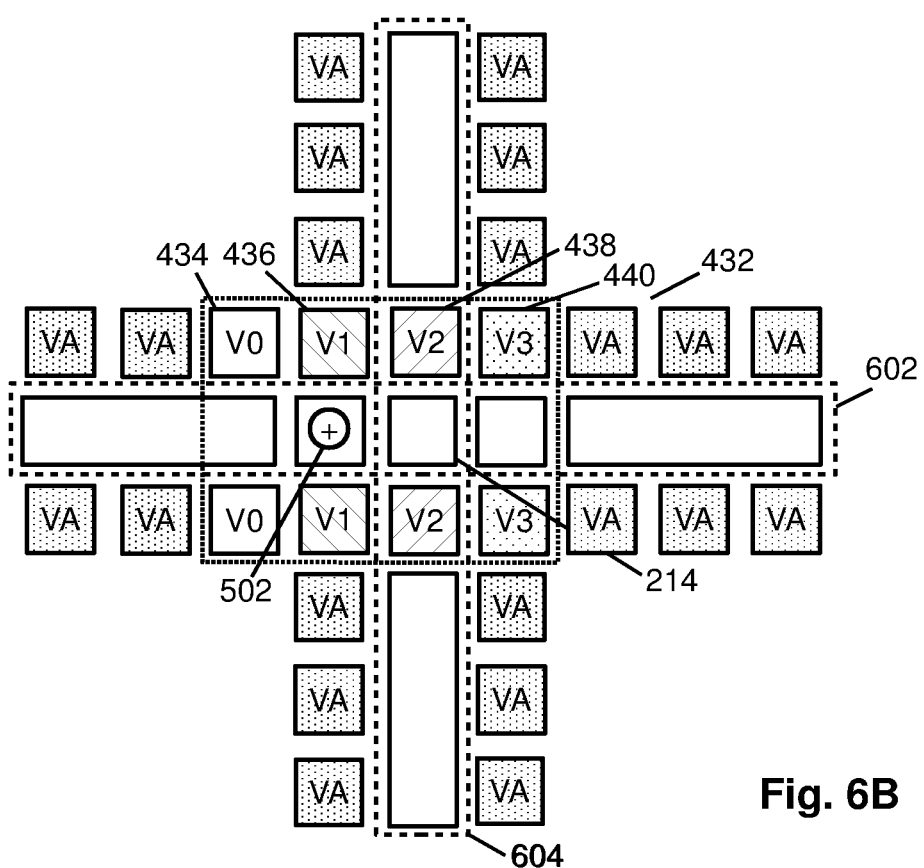

FIG. 6B illustrates the shuttling electrode group 432 advancing the ion 502 toward the intersection 214. In this position, the shuttling electrode group 432 may span the intersection 214 along the first lane 602 and may use lane elements as a set of electrodes. The shuttling electrode group 432 may further have at least one set of electrodes opposite the intersection 214 from the ion 502 and intermediate shuttling electrodes 436. Additionally, the intermediate shuttling electrode 436 may be immediately adjacent to the intersection 214, causing the ion 502 to be immediately adjacent to the intersection 214.

Figure 6C:
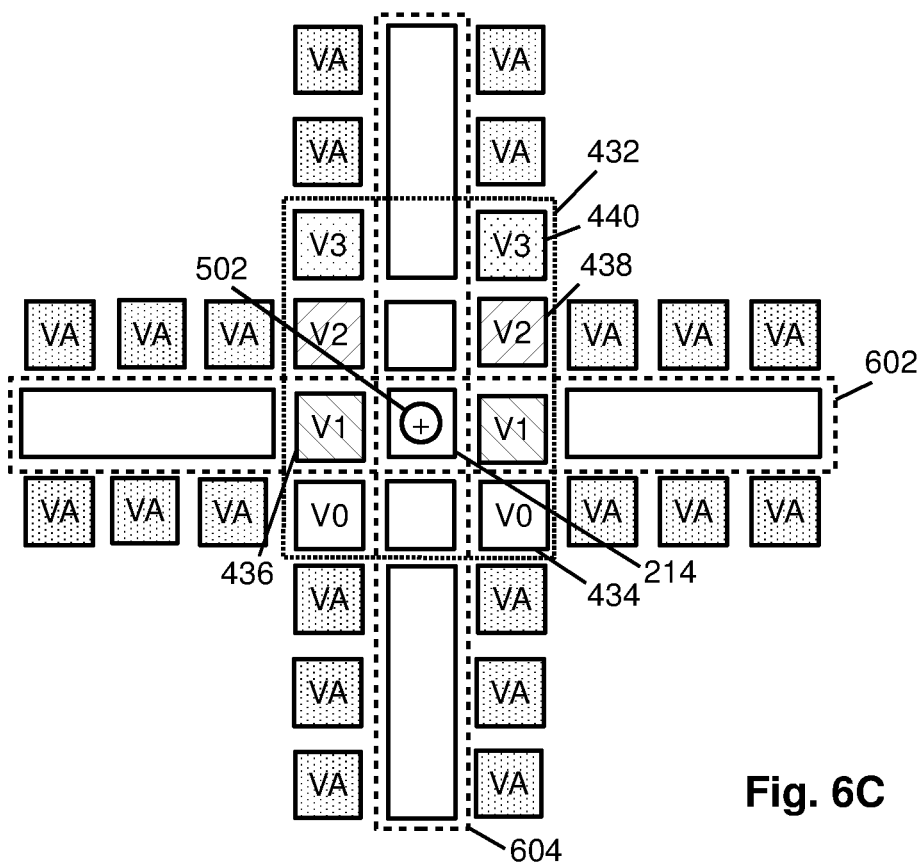

FIG. 6C illustrates an operational arrangement where the shuttling electrode group 432 moved the ion 502 into the intersection 214. In some embodiments, in this position, the shuttling electrode group 432 may be rotated, or moved to the second lane 604 to span the intersection 214 along the second lane 602. In some embodiments, in this position, the shuttling electrode group 432 may use lane elements as a set of electrodes and span the intersection 214 along the first lane 602. The intermediate shuttling electrodes 436 may be provided by lane elements spanning the intersection 214 to cause the ion 502 to move into the intersection 214. Thus, the intermediate shuttling electrodes 436 may directly span the intersection 214 while the ion 502 is in the intersection 214.

Figure 6D:
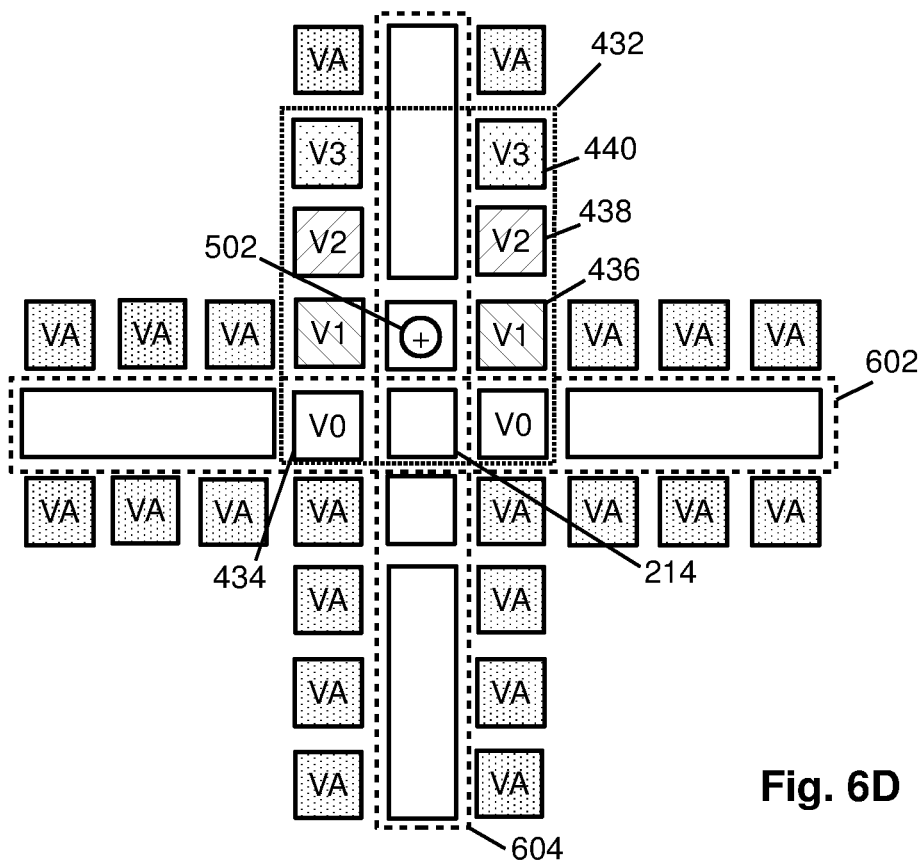

FIG. 6D illustrates the shuttling electrode group 432 moving the ion 502 away from the intersection 214 along the second lane 604. In this position, the ion 502 has been moved from the intersection 214, or from the first lane, outside of the intersection 214, into the second lane 604. In some embodiments where lane elements are used as electrodes in the shuttling electrode group 432, when the ion 502 is moved onto the second lane 604, lane elements of the first lane 602 that span the intersection 214 may be used as part of the shuttling electrode group. For example, as the ion 502 is moved away from the intersection 214, lane elements of the first lane 602 may be used as the first bounding shuttling electrode 434.

In some embodiments, the ion 502 may be moved from the position as shown in FIG. 6B to the position in FIG. 6D, without an explicit portion of the shuttling electrode group causing the ion to move into the intersection.

Figure 6E:
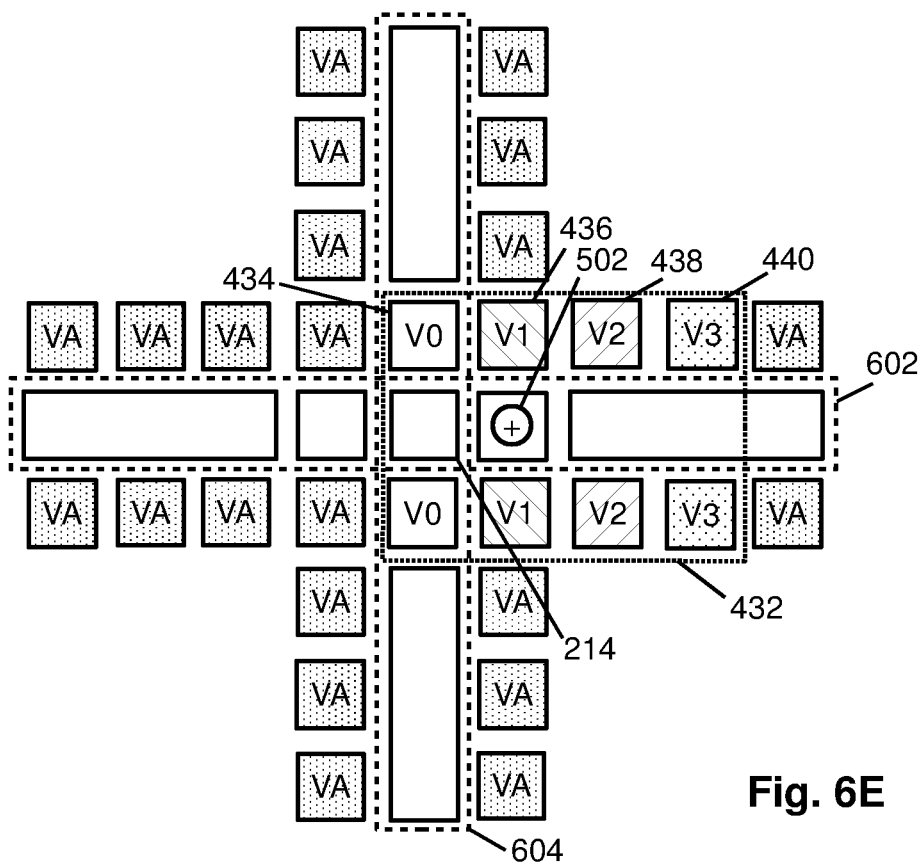

FIG. 6E illustrates the shuttling electrode group 432 moving the ion 502 away from the intersection 214 along the first lane 604 for linear shuttling past the intersection 214 according to some embodiments. In some embodiments, the shuttling electrode group 432 may extend across the intersection 214, which enlarges or extends the voltage profile provided by the shuttling electrode group 432. Enlarging the shuttling electrode group permits faster movement of the in 502 with less heating, and extending the shuttling electrode across the intersection permits enlargement of the physical area covered by the shuttling electrode group 432 without increasing the number of electrodes in the shuttling electrode group 432.

Figure 6F:
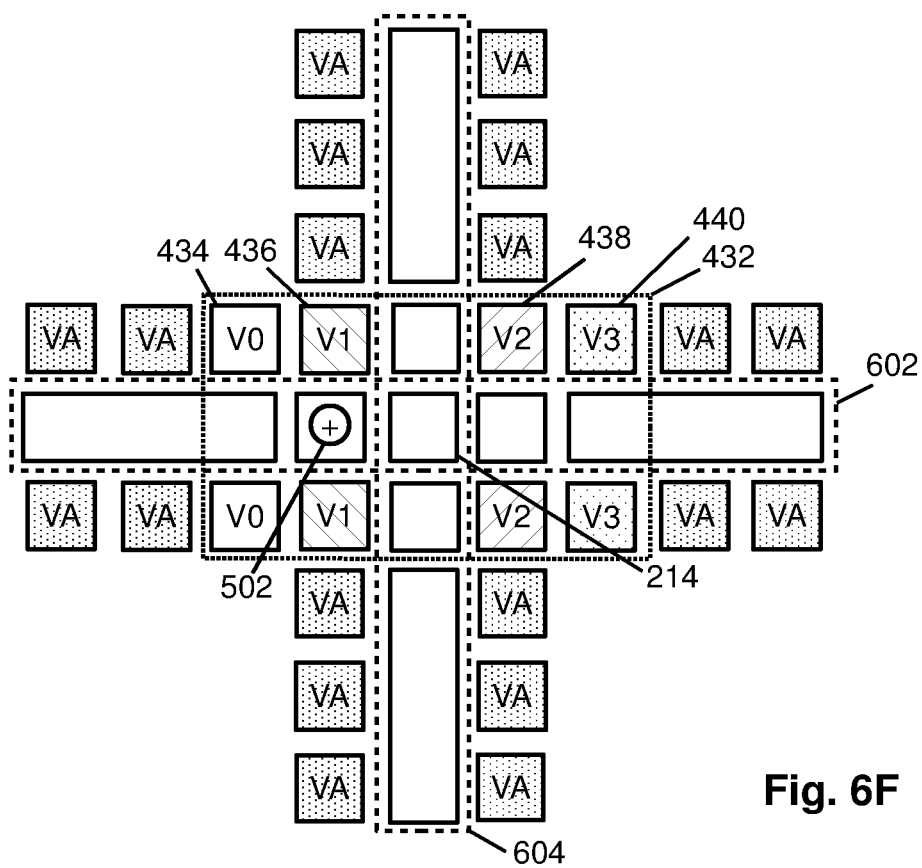

FIG. 6F illustrates the shuttling electrode group 432 including electrodes that avoid or skip the lanes 602, 604 according to some embodiments. For example, the illustrated shuttling electrode arrangement 432 may be provided to move the ion into the intersection 214 without using lanes elements as electrodes of the shuttling electrode group 432. In some embodiments, the shuttling electrode group 432 may straddle the lane elements of the second lane 604, and the intersection 214. Thus, lane elements of the first lane 602 that span the intersection 214 may be used as part of the shuttling electrode group 432 to cause the ion 502 to move into the intersection 214. Accordingly, the shuttling electrode group 432 may have the first bounding shuttling electrode 434 and intermediate shuttling electrode 436 on a first side of the intersection 214 or the second lane 604, and with the second bounding shuttling electrode 438 and third bounding shuttling electrode 440 on an opposite side, or a second side of the intersection 214 or second 604. The shuttling electrode group 432 may then move along the second lane 604 to move the ion 502 away from the intersection 214.

Instead, the layout of the electrodes with respect to the lanes 602, 604 may not allow for direct placement of the ion in the intersection 214. Moving the ion 502 from the first lane 602 adjacent to the intersection 214, through the intersection 214, directly to the second lane 604 outside of the intersection, may be advantageous. Thus, the system may provide for moving an ion 502 from a first lane 602 to a second lane 604, providing multidimensional controlled movement of ions for trapped ion quantum computing.

Additionally, while not illustrated, one or more electrodes may be split or differently shaped so that multiple different shuttling voltages may be provided to the lanes 602, 604 for more customized or finer control of the electric field for ion shuttling.

Figure 7A:
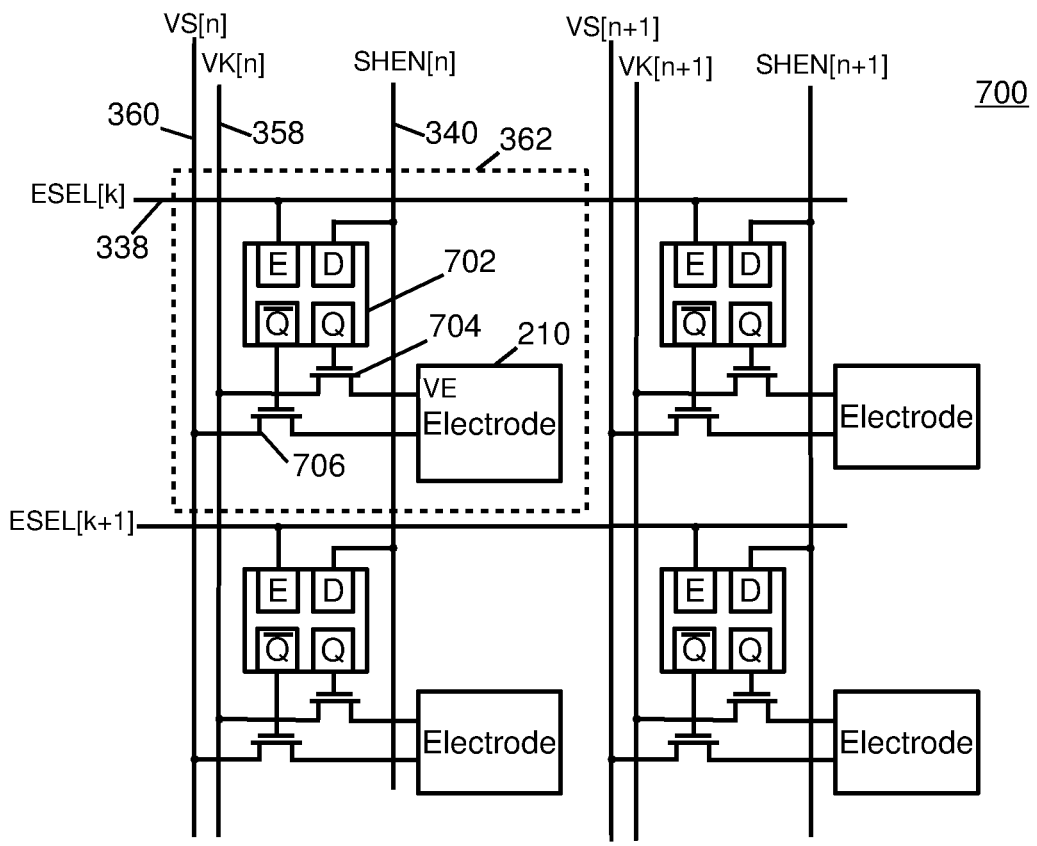
FIGS. 7A-7B illustrate electrode voltage control devices according to some embodiments.
Figure 7B:
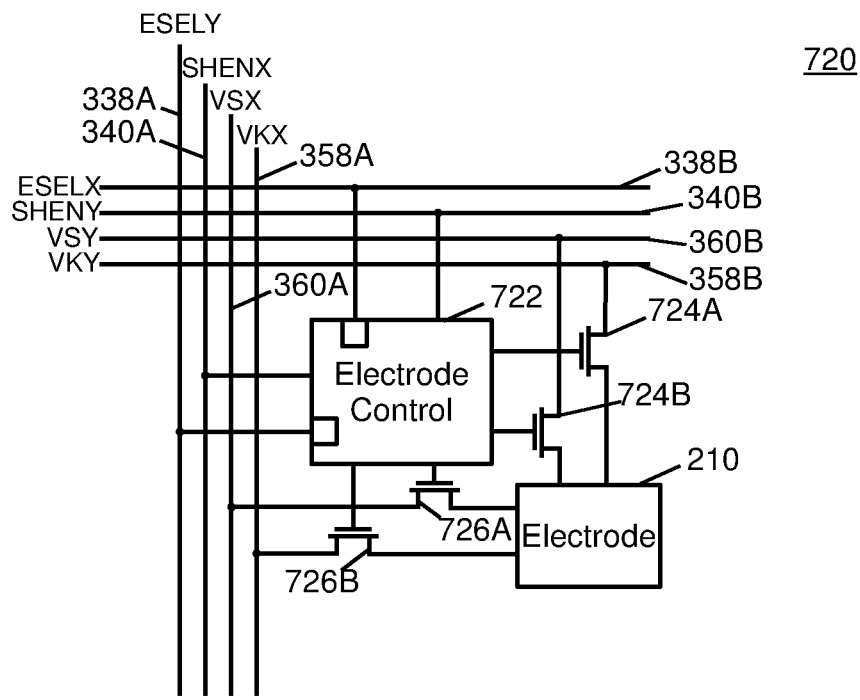
Figure 7C:
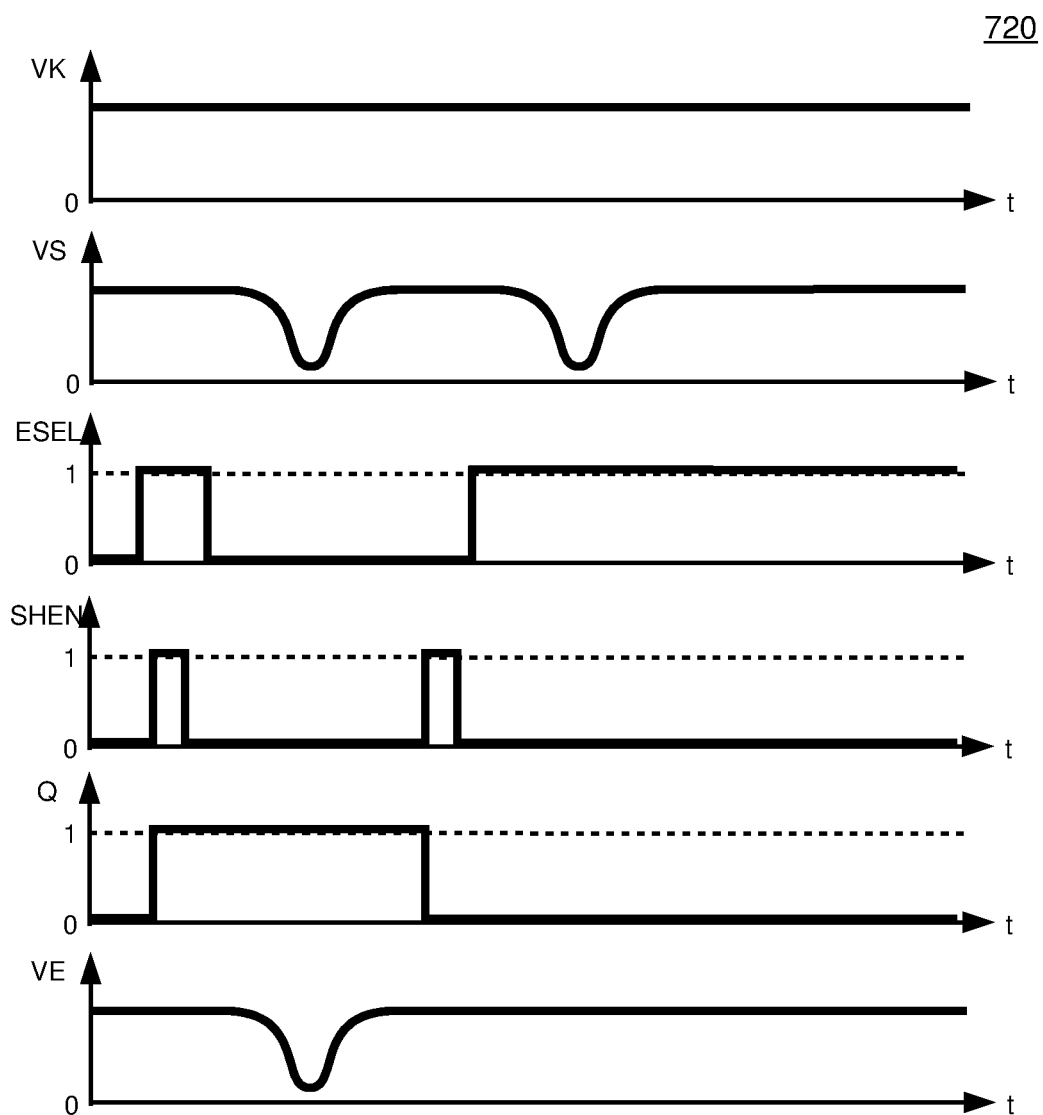
FIG. 7C illustrates control and output voltages associated with an electrode voltage control device according to some embodiments.

FIGS. 7A-7B illustrate electrode voltage control devices according to some embodiments. FIG. 7A illustrates a system 700 for providing electrode elements 362 in a single dimension according to some embodiments. FIG. 7C illustrates control and output voltages associated with an electrode voltage control device according to some embodiments. Multiple electrode elements 362 may be located in the system 700, and each electrode element 362 may be connected to electrical connections providing ESEL signals 338, SHEN signals 340, VS signals 360 and VK signals 358.

The electrode element 362 may, in some embodiments, include a data holding element such as a latch 702. In some embodiments, the latch 702 may be a one bit storage element such as a set-reset (SR) latch, as a delay latch (D latch), or like, or may be another type of switch, latch, or the like. In other embodiments, a flip flop, state machine, storage circuit, logic element, or other storage element may be used to hold or latch a control signal such as the ESEL signal 338.

A D latch may have an enable (E) port and data (D) port, and a positive output (Q) port, and inverted output (Q) port. The latch 702 may, in some embodiments, latch a value at the data port when the enable port is set or the ESEL 338 signal is activated, and hold the data value on the output port (and hold the inverse of the data value on the inverted output port). When the SHEN signal is activated, or high, the positive output port value (Q) will be high, or set. Thus, as shown in FIG. 7C, when the ESEL signal his asserted, the value presented by the SHEN will be propagated to the positive output port (Q0 and the value at Q will be maintained regardless of changes to the value of SHEN. The electrode element 362 may also have voltage control transistors 704, 706 that are connected to the VS and VK lines to control connection for the VS and VK lines to the electrode 210. Thus, when the positive output port is set, a shuttle voltage control transistor 706 may be set or open to connect the electrode 210 the shuttle voltage line, so that the electrode 210 has the shuttle voltage VS provided on the shuttle voltage line. When the inverted output port is set, a keeping voltage control transistor 704 may be set or open to connect the keeping voltage line to the electrode 210.

While a single electrode 210 is shown for each electrode element 362 in this arrangement, it should be understood, that any number of electrodes may be connected the voltage control transistors 704, 706. For example, as discussed above, electrode pairs may be located on opposite sides of a shuttling lane or lane element, and the electrodes that are immediately opposite from each other may be set to the same voltage. Thus, both electrodes 210 of an electrode pair may be electrically connected to, or controlled by a single latch 702, reducing the number of elements needed to control the electrodes 210 along a shuttling lane. In other embodiments, each electrode may be part of a separate electrode element 362, permitting individual control of voltages of electrodes 210 directly across a shuttling lane or lane element from each other.

While a latch is shown for the electrode elements 362, any storage elements that permits holding, latching or storage of the SHEN signal 340 may be used. Additionally, while not shown, the electrode elements 362 may include noise filters such as operational amplifier (op-amp) circuits, or may include additional voltage storage for providing, for example, entanglement voltages to the electrodes 210. Additionally, each electrode elements 362 may have a capacitor, or the electrode 210 itself may have some capacitance, so that the ESEL signal 338 and SHEN signal 340 may be used to charge the electrode 201 capacitor according to the selected VS voltage signals 360 or VK voltage signals 358. The capacitor then holds the voltage at the electrode 201 so that the ESEL signal 338 and SHEN signal 340 may be used to set voltages on other electrode elements 362, permitting control of multiple set of ions in parallel.

FIG. 7B illustrates an electrode element 720 for multidimensional control of electrodes 210 according to some embodiments. Multiple electrode elements 720 may be located in a system, and each electrode element 720 may be connected to electrical connections for to the x- and y-directions. Thus, the electrode element 720 may be connected to electrical connections for x-direction electrode select (ESELX) signals 338B, x-direction shift enable (SHENX) signals 340A, x-direction shuttle voltage (VSX) signals 360A, x-direction keeping voltage (VKX) signals 358A, y-direction electrode select (ESELY) signals 338A, y-direction shift enable (SHENY) signals 340B, y-direction shuttle voltage (VSY) signals 360B, and y-direction keeping voltage (VKY) signals 358B.

In some embodiments, the electrode element 720 has an electrode control 722, such as a state machine, latches, digital storage or logic, or the like. For example, the electrode control 722 may be an asynchronous state machine built from, for example, D latches and logic. In some embodiments, the desired electrode horizontally or vertically applied voltage may be activated by setting or activating the appropriate electrode select line ESELX, ESELY. Thus, a set of electrodes in a line may be activated, and the non-needed voltage lines VSX, VSY, VKX, VKX would be disconnected. Such an arrangement permits the orientation of the line of electrodes to be activated, permitting a limited number of DACs to be used, and reducing circuit complexity while providing for multidimensional ion shuttling.

In some embodiments where the electrode control 722 is a pair of latches, one of the ESELX or ESELY signals is activated and a latch from the pair of latches of the electrode control 722 latches the respective SHEN value. Thus, the associated EXELX or ESELY signals select whether the relevant latches activate the relevant x-direction voltage control transistors 726A, 726B or y-direction voltage control transistors 724A, 724B, when the respective SHENX or SHENY value is activated. Activating the x-direction voltage control transistors 726A, 726B connects the selected VSX 360A or VKX 358A to the electrode 210, and activating the y-direction voltage control transistors 724A, 724B connects the selected VSY 360B or VKY 358B to the electrode 210. Additionally, in some embodiments, login may be provided to ensure that only one set of transistor direction transistors is connected at any particular time, such that, for example, setting EXELX disconnects both y-direction transistors 724A and 724B.

Figure 8:
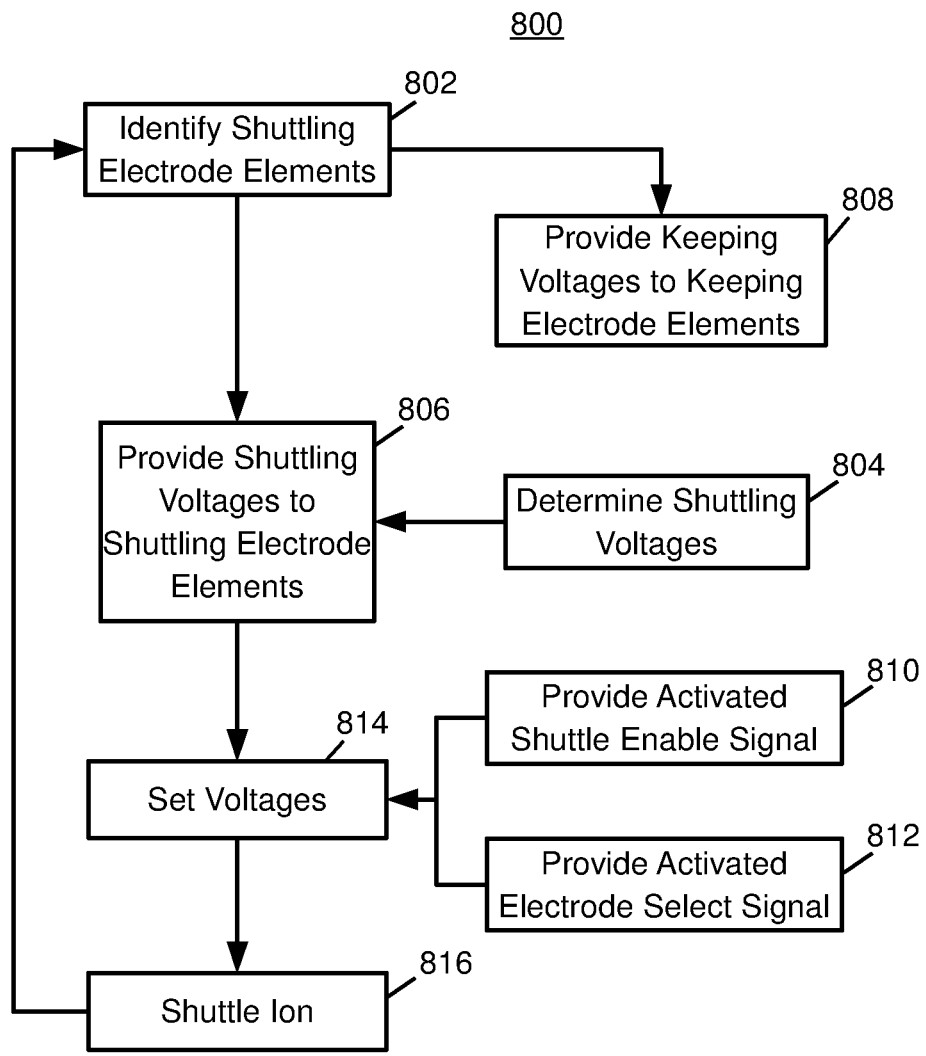
FIG. 8 is a flow diagram illustrating a method for providing ion shuttling according to some embodiments.

FIG. 8 is a flow diagram illustrating a method 800 for providing ion shuttling according to some embodiments. In block 802, shuttling electrode elements are identified. The shuttling electrode elements may be explicitly described in, for example, ion control information, or a location, direction, path or the like, may be identified, and an element, such as a decoder, or the like may identify the individual shuttling electrode elements from the ion control information, by for example, determining which electrode elements are part of the shuttling electrode group based on the identified location and the shuttling voltage profile requirements.

In block 808, a keeping voltage is provided to a group of electrode elements that is outside of the shuttling group electrodes. In some embodiments, the group of electrode elements includes keeping electrode elements outside of the shuttling group electrodes, so that a keeping voltage can be applied adjacent to the shuttling electrode group.

In block 804, one or more shuttling voltages may be determined. In some embodiments, the shuttling voltages may be associated with a shuttling voltage profile, and may be sent in the ion control information, or may be determined from the ion control information. The shuttling voltages may be sent to a set of shuttling voltage DACs, which generate the required shuttling voltages. In block 806, the shuttling voltages are provided to shuttling electrode elements. In some embodiments, a shuttling voltage is provided to each shuttling electrode element by selectively connecting to each electrode element to a shuttling voltage DAC using a multiplexer.

Keeping voltages may remain constant, when set, to keep ios in the current position. However, shuttling voltages may be modulated, and may also be transient to provide a desired voltage profile and movement, while reducing adiabatic heating. For example, a DAC may be updated at a 100 kHz . . . 1 MHz rate to move the ion between intermediate electrodes with a suited voltage pattern while minimizing adiabatic heating.

In block 810, an activated shuttle enable (SHEN) signal is provided to rows or columns having the shutting electrode elements. In block 812, an activated electrode select (ESEL) signal is provided to rows or columns of electrode elements in the group. In some embodiments, the ESEL signal is applied in a direction of movement of an ion so that the ESEL selects electrode elements for application of the keeping voltage in front of, and in back of, the ion along an axis or direction of travel. Additionally, the ESEL and SHEN signals may be provided or activated in different directions so that shuttling is activated in a precise location. For example, the SHEN signal may be provided along an x-axis, and the ESEL signal may be provided along a y-axis, so that the shuttling electrode elements are location at the intersection of the SHEN and ESEL signals. The remaining electrode elements that are provided with the ESEL signal, but are not provided with the SHEN signal, would be keeping electrode elements.

In block 814, a voltage provided to the electrode elements are set. The shuttling electrode elements set the shuttling voltage provided to the respective shuttling electrode elements, and the keeping electrode elements set the provided keeping voltage. The voltages are proved to the respective electrodes of the electrode elements, forming an E-field. Thus, in block 816, an ion may be shuttled or controlled. The process may be repeated, to move the ion to a next location, or to hold an ion in a location by identifying second electrode elements as a shuttling electrode group in a new location (block 802), providing the s shuttling voltages (block 806) to the second electrode elements and providing keeping voltages to the relevant electrodes outside of the second electrode elements, providing the activated SHEN signals (block 810) and providing the activated ESEL signals (block 812) so that the second electrode elements set the voltage (block 814) and the ion is shuffled to a new location (block 816).

An embodiment apparatus for multidimensional ion shuttling includes a first shuttling lane having first lane elements, a second shuttling lane having second lane elements, wherein the second shuttling lane intersects the first shuttling lane at an intersection, first electrode elements located along the first movement lane, second electrode elements located along the second movement lane, an electrode control circuit connected to each electrode element of the first electrode elements and the second electrode elements, and a voltage control circuit connected to each electrode element of the first electrode elements and the second electrode elements. The voltage control circuit is configured to selectively provide at least one voltage to one or more electrode elements of the first electrode elements and of the second electrode elements according to signaling from the electrode control circuit, and the at least one voltage controls movement of an ion along at least one of the first shuttling lane or the second shuttling lane.

In some embodiments, the voltage control circuit includes a plurality of digital-to-analog converters (DACs) and a multiplexer configured to selectively connect each DAC of the plurality of DACs to each electrode element of the first electrode elements and the second electrode elements. In some embodiments, the voltage control circuit further includes a plurality of DAC registers, where the plurality of DAC registers is connected to a data handling element, where the data handling element is configured to send data signals having a plurality of voltage values to the DAC registers, and where each DAC register of the plurality of DAC registers is configured to store a voltage value of the plurality of voltage values, and to provide the respective voltage value to a DAC of the plurality of DACs. In some embodiments, the plurality of DACs includes a plurality of keeping voltage DACs and a plurality of shuttling voltage DACs, and where each keeping voltage DAC of the plurality of keeping voltage DACs is configured to provide, to each electrode element of the first electrode elements and second electrode elements, through the multiplexer, a keeping DAC signal that includes at least one of a keeping voltage selected according to the plurality of voltage values or a neutral voltage that is of a neutral voltage profile and that is selected according to the plurality of voltage values, and where each shuttling voltage DAC of the plurality of shuttling voltage DACs is configured to provide, to each electrode element of the first electrode elements and second electrode elements, through the multiplexer, a shuttling DAC signal that includes at least one shuttling voltage of a shuttling voltage profile. In some embodiments, the shuttling voltage profile includes two or more shuttling voltages that are different from the keeping voltage. In some embodiments, the ion is a positively charged ion and each of the two or more shuttling voltages are lower than the keeping voltage. In some embodiments, the multiplexer is configured to selectively connect each electrode element of the first electrode elements and the second electrode elements to a shuttling voltage DAC of the plurality of shuttling voltage DACs according to control signals from the electrode control circuit. In some embodiments, each electrode element of the first electrode elements and the second electrode elements is configured to latch one of the keeping DAC signal or the shuttling DAC signal according to a shuttle enable signal activation.

An embodiment multidimensional ion shuttling apparatus includes electrode elements located along a first shuttling lane, an electrode control circuit connected to each of the electrode elements, where the electrode control circuit is configured to provide an activated first electrode select signal to a first group of electrode elements that is of the electrode elements that includes at least shuttling electrode elements of a shuttling electrode group, and where the electrode control circuit is configured to provide an activated first shuttle enable signal to each first shuttling electrode element, and a voltage control circuit connected to each of the electrode elements, where the voltage control circuit is configured to provide one or more shuttling voltages of a shuttling voltage profile to the shuttling electrode elements of the shuttling electrode group. The electrode elements are configured to apply a respective received shuttling voltage on an electrode of the respective electrode element in response to both the first electrode select signal and the first shuttle enable signal received at the respective electrode element being activated.

In some embodiments, the voltage control circuit includes a plurality of digital-to-analog converters (DACs) and a multiplexer configured to selectively connect each DAC of the plurality of DACs to each of the electrode elements. In some embodiments, the voltage control circuit further includes a plurality of DAC registers, where the plurality of DAC registers are each configured to received data signals having a plurality of voltage values to the DAC registers, and where each DAC register of the plurality of DAC registers is configured to store a voltage value of the plurality of voltage values, and to provide the respective voltage value to a DAC of the plurality of DACs. In some embodiments, the plurality of DACs includes a plurality of keeping voltage DACs and a plurality of shuttling voltage DACs, and where each keeping voltage DAC of the plurality of keeping voltage DACs is configured to provide, to each of the electrode elements, through the multiplexer, at least one of a keeping voltage selected according to the plurality of voltage values or a neutral voltage that is of a neutral voltage profile and that is selected according to the plurality of voltage values and where each shuttling voltage DAC of the plurality of shuttling voltage DACs is configured to provide, to each of the electrode element, through the multiplexer, at least one shuttling voltage of a shuttling voltage profile. In some embodiments, the electrode elements include first electrode elements located along the first shuttling lane, where the first shuttling lane intersects a second shuttling lane at an intersection, and where the electrode elements further include second electrode elements located along the second shuttling lane. In some embodiments, the first electrode elements are configured to shuttle an ion along the first shuttling lane to the intersection, and the second electrode elements are configured to continue shuttling the ion along the second shuttling lane after the first electrode elements shuttle the ion to the intersection. In some embodiments, the multiplexer is configured to selectively connect each of the electrode elements to a shuttling voltage DAC of the plurality of shuttling voltage DACs.

An embodiment ion shuttling method for a trapped ion quantum computing system includes identifying, as first shuttling electrode elements of a shuttling electrode group, first electrode elements of a plurality of electrode elements of an ion shuttling system, where the first electrode elements are located at a first location along a first shuttling lane, determining one or more shuttling voltages of a shuttling voltage profile, providing the one or more shuttling voltages to the first shuttling electrode elements of the shuttling electrode group, providing a first activated electrode select signal to a first group of electrode elements that includes at least the first shuttling electrode elements, providing a first activated shuttle enable signal to each first shuttling electrode element, generating, at each first shuttling electrode element, a selected voltage for the respective first shuttling electrode element in response to both the first electrode select signal and the first shuttle enable signal being activated for the respective first shuttling electrode element, where the selected voltage is the shuttling voltage provided to the first respective shuttling electrode element and which is set by the respective first shuttling electrode element, and shuttling an ion along the first shuttling lane by generating an electrical field (E-field), where the E-field is generated by applying the selected voltage of each first shuttling electrode element to an electrode of the respective first shuttling element.

In some embodiments, the method further includes identifying, as second shuttling electrode elements of the shuttling electrode group, second electrode elements of the plurality of electrode elements, where the second shuttling electrode elements are located at a second location along a second shuttling lane that intersects the first shuttling lane at an intersection, providing the one or more shuttling voltages to the second shuttling electrode elements, providing a second activated electrode select signal to a second group of electrode elements that includes at least the first shuttling electrode elements, providing a second activated shuttle enable signal to each second shuttling electrode element, generating, at each second shuttling electrode element, a selected voltage for the respective second shuttling electrode element in response to both the second electrode select signal and the second electrode select signal being activated for the respective second shuttling electrode element, where the selected voltage is the shuttling voltage provided to the respective second shuttling electrode element and which is set by the respective second shuttling electrode element, and shuttling the ion along the second shuttling lane by generating an E-field, where the E-field is generated by applying the selected voltage of each second shuttling electrode element to an electrode of the respective second shuttling element.

In some embodiments, the E-field is an asymmetric E-field that provides a voltage field with lower voltage gradient or E-field gradient at one side that causes movement in a desired direction. In some embodiments, providing the one or more shuttling voltages to the first shuttling electrode elements of the shuttling electrode group includes converting digital voltage values to analog shuttling voltages using a plurality of shuttling digital-to analog converter (DACs), where each shuttling DAC of the plurality of shuttling DACs generates a different analog shuttling voltage, and connecting, by one or more multiplexers according to one or more control signals, each of the first shuttling electrode elements to one of the shuttling DACs such that the respective shuttling element receives the analog shuttling voltage generated by the connected DAC. In some embodiments, the method further includes providing a keeping voltage to third electrode elements, other than the first shuttling electrode elements, of the first group of electrode elements, and generating, at each third electrode element, a selected voltage for the respective third electrode element in response to the first electrode select signal being activated, and further in response to the respective third electrode element not receiving an activated shuttling enable signal, where the selected voltage is the keeping voltage provided to the respective third electrode element and which is set by the respective third electrode element.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus, comprising:
   a first shuttling lane comprising first lane elements;
   a second shuttling lane comprising second lane elements;
   first electrode elements located along the first shuttling lane;
   second electrode elements located along the second shuttling lane;
   an electrode control circuit connected to each electrode element of the first electrode elements and the second electrode elements; and
   a voltage control circuit connected to each electrode element of the first electrode elements and the second electrode elements, wherein the voltage control circuit is configured to selectively provide at least one voltage to one or more electrode elements of the first electrode elements and of the second electrode elements according to signaling from the electrode control circuit, wherein the at least one voltage controls movement of an ion along at least one of the first shuttling lane or the second shuttling lane, wherein providing the at least one voltage to the one or more electrode elements of the first electrode elements and of the second electrode elements comprises providing, to one or more electrode elements of the first electrode elements and of the second electrode elements, at least one of a keeping voltage or a neutral voltage that is of a neutral voltage profile, and further comprises providing, to one or more electrode elements of the first electrode elements and the second electrode elements, a shuttling DAC signal that comprises at least one shuttling voltage of a shuttling voltage profile.

2. The apparatus of claim 1, wherein the voltage control circuit comprises a plurality of digital-to-analog converters (DACs) and a multiplexer configured to selectively connect each DAC of the plurality of DACs to each electrode element of the first electrode elements and the second electrode elements.

3. The apparatus of claim 2, wherein the voltage control circuit further comprises a plurality of DAC registers, wherein the plurality of DAC registers is connected to a data handling element, wherein the data handling element is configured to send data signals having a plurality of voltage values to the DAC registers, and wherein each DAC register of the plurality of DAC registers is configured to store a voltage value of the plurality of voltage values, and to provide the respective voltage value to a DAC of the plurality of DACs.

4. The apparatus of claim 3, wherein the plurality of DACs comprises a plurality of keeping voltage DACs and a plurality of shuttling voltage DACs, and wherein each keeping voltage DAC of the plurality of keeping voltage DACs is configured to provide, to one or more electrode elements of the first electrode elements and the second electrode elements, through the multiplexer, a keeping DAC signal that comprises at least one of a keeping voltage selected according to the plurality of voltage values or a neutral voltage that is of the neutral voltage profile and that is selected according to the plurality of voltage values; and
wherein each shuttling voltage DAC of the plurality of shuttling voltage DACs is configured to provide, to one or more electrode elements of the first electrode elements and second electrode elements, through the multiplexer, a shuttling DAC signal that comprises at least one shuttling voltage of the shuttling voltage profile.

5. The apparatus of claim 4, wherein the shuttling voltage profile comprises two or more shuttling voltages that are different from the keeping voltage.

6. The apparatus of claim 5, wherein the ion is a positively charged ion and wherein each of the two or more shuttling voltages is lower than the keeping voltage.

7. The apparatus of claim 4, wherein the multiplexer is configured to selectively connect each electrode element of the first electrode elements and the second electrode elements to a shuttling voltage DAC of the plurality of shuttling voltage DACs according to control signals from the electrode control circuit.

8. The apparatus of claim 4, wherein each electrode element of the first electrode elements and the second electrode elements is configured to latch one of the keeping DAC signal or the shuttling DAC signal according to a shuttle enable signal activation.

9. An apparatus, comprising:
electrode elements located along a first shuttling lane;
an electrode control circuit connected to each of the electrode elements, wherein the electrode control circuit is configured to provide an activated first electrode select signal to a first group of electrode elements that is of the electrode elements that comprises at least shuttling electrode elements of a shuttling electrode group, wherein the electrode control circuit is configured to provide an activated first shuttle enable signal to each first shuttling electrode element; and
a voltage control circuit connected to each of the electrode elements, wherein the voltage control circuit is configured to provide one or more shuttling voltages of a shuttling voltage profile to the shuttling electrode elements of the shuttling electrode group;
wherein the electrode elements are configured to apply a respective received shuttling voltage on an electrode of the respective electrode element in response to both the first electrode select signal and the first shuttle enable signal received at the respective electrode element being activated;
wherein the voltage control circuit is further configured to provide at least one of a keeping voltage or a neutral voltage of a neutral voltage profile to keeping electrode elements of a keeping electrode group, wherein the keeping electrode group comprises electrode elements other than the shuttling electrode elements; and
wherein the electrode elements are further configured to apply the at least one of the keeping voltage or the neutral voltage on an electrode of the respective electrode element.

10. The apparatus of claim 9, wherein the voltage control circuit comprises a plurality of digital-to-analog converters (DACs) and a multiplexer configured to selectively connect each DAC of the plurality of DACs to each of the electrode elements.

11. The apparatus of claim 10, wherein the voltage control circuit further comprises a plurality of DAC registers, wherein the plurality of DAC registers are each configured to receive data signals having a plurality of voltage values to the DAC registers, and wherein each DAC register of the plurality of DAC registers is configured to store a voltage value of the plurality of voltage values, and to provide the respective voltage value to a DAC of the plurality of DACs.

12. The apparatus of claim 11, wherein the plurality of DACs comprises a plurality of keeping voltage DACs and a plurality of shuttling voltage DACs, and wherein each keeping voltage DAC of the plurality of keeping voltage DACs is configured to selectively provide, to each of the electrode element, through the multiplexer, at least one of a keeping voltage selected according to the plurality of voltage values or a neutral voltage that is of a neutral voltage profile and that is selected according to the plurality of voltage values; and
wherein each shuttling voltage DAC of the plurality of shuttling voltage DACs is configured to selectively provide, to each of the electrode element, through the multiplexer, at least one shuttling voltage of a shuttling voltage profile.

13. The apparatus of claim 12, wherein the electrode elements comprise first electrode elements located along the first shuttling lane, wherein the first shuttling lane intersects a second shuttling lane at an intersection, and wherein the electrode elements further comprise second electrode elements located along the second shuttling lane.

14. The apparatus of claim 13, wherein the first electrode elements are configured to shuttle an ion along the first shuttling lane to the intersection, and wherein the second electrode elements are configured to continue shuttling the ion along the second shuttling lane after the first electrode elements shuttle the ion to the intersection.

15. The apparatus of claim 12, wherein the multiplexer is configured to selectively connect each of the electrode elements to a shuttling voltage DAC of the plurality of shuttling voltage DACs.

16. An ion shuttling method for a trapped ion quantum computing system, the method comprising:
identifying, as first shuttling electrode elements of a shuttling electrode group, first electrode elements of a plurality of electrode elements of an ion shuttling system, wherein the first electrode elements are located at a first location along a first shuttling lane;
determining one or more shuttling voltages of a shuttling voltage profile;
providing the one or more shuttling voltages to the first shuttling electrode elements of the shuttling electrode group;
providing a first activated electrode select signal to a first group of electrode elements that comprises at least the first shuttling electrode elements;
providing a first activated shuttle enable signal to each first shuttling electrode element;
generating, at each first shuttling electrode element, a selected voltage for the respective first shuttling electrode element in response to both the first electrode select signal and the first shuttle enable signal being activated for the respective first shuttling electrode element, wherein the selected voltage is the shuttling voltage provided to the first respective shuttling electrode element and which is set by the respective first shuttling electrode element; and
shuttling an ion along the first shuttling lane by generating an electrical field (E-field), wherein the E-field is generated by applying the selected voltage of each first shuttling electrode element to an electrode of the respective first shuttling element.

17. The method of claim 16, further comprising:
identifying, as second shuttling electrode elements of the shuttling electrode group, second electrode elements of the plurality of electrode elements, wherein the second shuttling electrode elements are located at a second location along a second shuttling lane that intersects the first shuttling lane at an intersection;
providing the one or more shuttling voltages to the second shuttling electrode elements;
providing a second activated electrode select signal to a second group of electrode elements that comprises at least the second shuttling electrode elements;
providing a second activated shuttle enable signal to each second shuttling electrode element;
generating, at each second shuttling electrode element, a selected voltage for the respective second shuttling electrode element in response to both the second electrode select signal and the second shuttle enable signal being activated for the respective second shuttling electrode element, wherein the selected voltage is the shuttling voltage provided to the respective second shuttling electrode element and which is set by the respective second shuttling electrode element; and
shuttling the ion along the second shuttling lane by generating an E-field, wherein the E-field is generated by applying the selected voltage of each second shuttling electrode element to an electrode of the respective second shuttling element.

18. The method of claim 16, wherein the E-field is an asymmetric E-field that provides a voltage field with a lower voltage gradient or E-field gradient at one side that causes movement in a desired direction.

19. The method according to claim 16, wherein the providing the one or more shuttling voltages to the first shuttling electrode elements of the shuttling electrode group comprises:
converting digital voltage values to analog shuttling voltages using a plurality of shuttling digital-to analog converter (DACs), wherein each shuttling DAC of the plurality of shuttling DACs generates a different analog shuttling voltage; and
connecting, by one or more multiplexers according to one or more control signals, each of the first shuttling electrode elements to one of the shuttling DACs such that the respective shuttling element receives the analog shuttling voltage generated by the connected DAC.

20. The method according to claim 16, further comprising:
providing a keeping voltage to third electrode elements, other than the first shuttling electrode elements, of the first group of electrode elements; and
generating, at each third electrode element, a selected voltage for the respective third electrode element in response to the first electrode select signal being activated, and further in response to the respective third electrode element not receiving an activated shuttling enable signal, wherein the selected voltage is the keeping voltage provided to the respective third electrode element and which is set by the respective third electrode element.

* * * * *